United States Patent
Witte et al.

(10) Patent No.: US 9,604,796 B2
(45) Date of Patent: Mar. 28, 2017

(54) OVERHEAD CONVEYOR SYSTEM

(71) Applicant: AUTOMATIC FEED COMPANY, Napoleon, OH (US)

(72) Inventors: James H. Witte, Malinta, OH (US); Marvin Karl Himmelein, Perrysburg, OH (US); James Edwin Gerdeman, Toledo, OH (US); Kim Beck, Toledo, OH (US); Jeffrey Paul Gerken, Perrysburg, OH (US)

(73) Assignee: Automatic Feed Company, Napoleon, OH (US)

(*) Notice: Subject to any disclaimer, the term of this patent is extended or adjusted under 35 U.S.C. 154(b) by 0 days.

(21) Appl. No.: 15/027,532

(22) PCT Filed: Oct. 9, 2014

(86) PCT No.: PCT/US2014/059908
§ 371 (c)(1),
(2) Date: Apr. 6, 2016

(87) PCT Pub. No.: WO2015/057491
PCT Pub. Date: Apr. 23, 2015

(65) Prior Publication Data
US 2016/0244276 A1 Aug. 25, 2016

Related U.S. Application Data

(60) Provisional application No. 61/890,514, filed on Oct. 14, 2013.

(51) Int. Cl.
| | | |
|---|---|---|
| B65G 17/46 | (2006.01) | |
| B65G 15/58 | (2006.01) | |
| B65G 57/00 | (2006.01) | |
| B65G 21/20 | (2006.01) | |

(Continued)

(52) U.S. Cl.
CPC ......... B65G 57/00 (2013.01); B65G 21/2018 (2013.01); B65G 21/2036 (2013.01);
(Continued)

(58) Field of Classification Search
CPC ............ B65G 21/2009; B65G 21/2018; B65G 21/2027
(Continued)

(56) References Cited

U.S. PATENT DOCUMENTS 3,161,278 A * 12/1964 Buccicone ......... B65G 21/2018
  198/462.2
3,409,149 A * 11/1968 Graux .................. B65G 59/045
  271/11

(Continued)

FOREIGN PATENT DOCUMENTS

| EP | 0827920 A2 | 3/1998 |
| EP | 1486436 B1 | 5/2008 |
| WO | WO-2010124767 A1 | 11/2010 |

OTHER PUBLICATIONS

International Search Report and Written Opinion of the International Searching Authority for PCT/US2014/059908, mailed Jan. 21, 2015; ISA/US.

*Primary Examiner* — Douglas Hess
(74) *Attorney, Agent, or Firm* — Harness, Dickey & Pierce, P.L.C.

(57) ABSTRACT

The present disclosure provides a system for transporting work pieces from one location to another. The system uses either magnetic force or vacuum, or both, to lift and retain the work pieces against the moving overhead conveyor belt. The system can interrupt the magnetic force and/or the vacuum to release the work pieces from against the moving overhead conveyor belt at a desired transport location.

24 Claims, 13 Drawing Sheets

(51) Int. Cl.
 B65G 57/04 (2006.01)
 B65G 43/00 (2006.01)
 B65G 47/91 (2006.01)
 B65G 47/92 (2006.01)
(52) U.S. Cl.
 CPC ............ *B65G 43/00* (2013.01); *B65G 47/91* (2013.01); *B65G 47/92* (2013.01); *B65G 57/04* (2013.01)
(58) Field of Classification Search
 USPC ................ 198/688.1, 689.1, 690.1
 See application file for complete search history.

(56) References Cited

U.S. PATENT DOCUMENTS

| | | | | |
|---|---|---|---|---|
| 5,819,907 A | 10/1998 | Simkowski | | |
| 6,158,573 A * | 12/2000 | Janzen | ............... | B65G 15/58 198/689.1 |
| 6,206,176 B1 * | 3/2001 | Blonigan | .......... | H01L 21/67709 198/619 |
| 6,422,377 B1 * | 7/2002 | Ulrich | ................ | B65G 21/2036 198/689.1 |
| 6,588,580 B2 * | 7/2003 | Janzen | ................... | B65G 15/58 198/689.1 |
| 6,823,986 B2 * | 11/2004 | Vogel | ................... | B65G 47/911 198/688.1 |
| 6,840,733 B2 * | 1/2005 | Bjorn | .................... | B65G 57/04 271/196 |
| 6,997,549 B2 * | 2/2006 | Howarth | ................ | B41J 11/007 101/407.1 |
| 8,408,129 B2 * | 4/2013 | Schmid | ................ | B41J 11/0085 101/324 |
| 8,741,387 B2 * | 6/2014 | Vontell | ................... | B05D 1/305 427/180 |
| 9,004,266 B2 * | 4/2015 | Neuhaeuser | ........... | B65G 15/32 198/690.1 |
| 2003/0019729 A1 | 1/2003 | Janzen | | |

\* cited by examiner

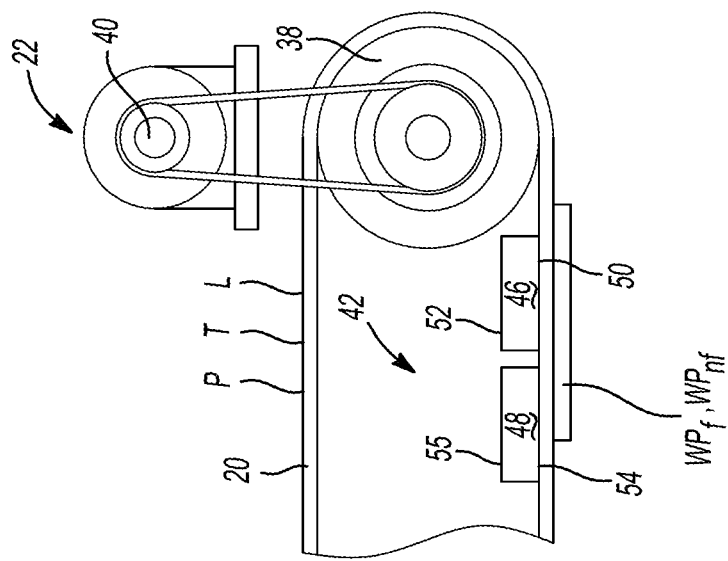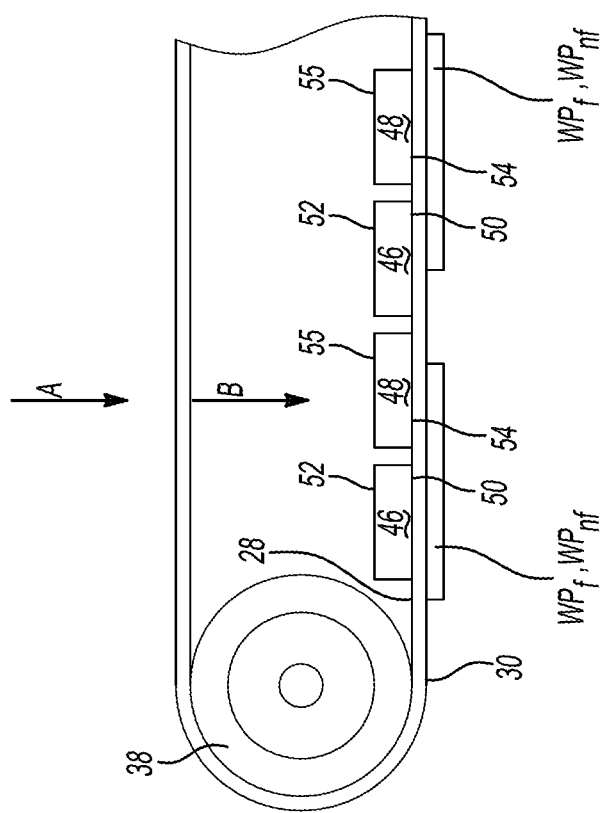
Fig-2

OVERHEAD CONVEYOR SYSTEM

CROSS REFERENCE TO RELATED APPLICATIONS

This application is a U.S. National Phase Application under 35 U.S.C. 371 of International Application No. PCT/US2014/059908 filed on Oct. 9, 2014. This application claims the benefit of priority from U.S. Provisional Patent Application No. 61/890,514, filed on Oct. 14, 2013. The entire disclosures of the above applications are incorporated herein by reference.

FIELD

The present disclosure relates to an overhead conveyor system for transporting work pieces that uses either magnetic force or vacuum, or both, to lift and vertically retain the work pieces against a moving, closed-loop overhead conveyor belt, and to a method for converting an overhead conveyor system accordingly.

BACKGROUND

This section provides background information related to the present disclosure, which is not necessarily prior art.

Known overhead conveyor systems are used for transporting work pieces from one location to another. Typically, during use, the work pieces are lifted and vertically retained against a moving, closed-loop overhead conveyor belt, and against the downward force of gravity, with magnetic force. Once the work pieces have been transported to a desired location, the work pieces are released from the moving overhead conveyor belt.

Because these overhead conveyor systems use magnetic force to lift and vertically retain the work pieces, they are necessarily limited to systems for transporting work pieces fabricated from ferromagnetic materials. Such a limitation precludes the use of a single overhead conveyor system for transporting work pieces that are fabricated from a variety of materials, such as ferromagnetic materials and non-ferromagnetic materials.

Consequently, it would desirable to achieve an overhead conveyor system that can also be used with non-ferromagnetic work pieces.

SUMMARY

This section provides a general summary of the disclosure, and is not a comprehensive disclosure of its full scope or all of its features.

In one form, the present disclosure provides a system for transporting work pieces. The system comprises a frame comprising a first end and a second end. The system also comprises at least one moving conveyor belt supported on the frame, and a magnetic system supported on the frame. The magnetic system generates a magnetic force that lifts and vertically retains the work pieces on the at least one moving conveyor belt. The system further comprises a vacuum system supported on the frame. The vacuum system draws or pulls a vacuum to lift and vertically retain the work pieces on the at least one moving conveyor belt. The system further comprises a stacker unit supported on the frame. The stacker unit is in communication with the magnetic system and is operable to neutralize the magnetic force generated by the magnetic system to release the work pieces from the at least one moving conveyor belt at a transport location. The stacker unit is in further communication with the vacuum system and is operable to interrupt the vacuum drawn by the vacuum system to release the work pieces from the at least one moving conveyor belt at the transport location.

The present disclosure further provides a method for converting an overhead conveying system that uses magnetic force to transport work pieces from one location to another into an overhead conveying system that uses magnetic force and vacuum to transport work pieces from one location to another. The method comprises attaching at least one first vacuum generator and at least one pair of second vacuum generators to the overhead conveying system and securing at least one row of vacuum units to the overhead conveying system adjacent a row of magnetic units. The method further comprises adjusting a vertical height of the at least one row of vacuum units such that the vacuum units are co-planar with the magnetic units, coupling the at least one row of vacuum units to either the at least one first vacuum generator or to the at least one pair of second vacuum generators, and creating at least one aperture through the moving conveyor belts.

Further areas of applicability will become apparent from the description provided herein. The description and specific examples in this summary are intended for purposes of illustration only and are not intended to limit the scope of the present disclosure.

DRAWINGS

The present disclosure will become more fully understood from the detailed description and the accompanying drawings, wherein:

FIG. 2 is a partial schematic side view of a conveyor assembly for of the overhead conveyor system according to the present disclosure;

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. The example embodiments will now be described more fully with reference to the accompanying drawings.

With reference to the accompanying figures, the present disclosure provides an overhead conveyor system 10 for transporting work pieces from one location to another. To transport the work pieces, the overhead conveyor system 10 uses either a magnetic force M, or a vacuum V, or both, to lift and vertically retain the work pieces against a moving, closed-loop overhead conveyor belt. Once the work pieces have been transported to a desired location (i.e., to a transport location), the work pieces are released from the moving, closed-loop overhead conveyor belt.

The present disclosure further provides a method for converting an overhead conveyor system that uses only magnetic force M to lift and vertically retain work pieces against a moving, closed-loop overhead conveyor belt into the overhead conveyor system 10 that uses either magnetic force M, or vacuum V, or both, to lift and vertically retain the work pieces against the moving, closed-loop overhead conveyor belt.

The overhead conveyor system 10 of the present disclosure can be configured to transport work pieces of a variety of shapes and sizes. In one example, the work pieces can be generally flat, plate-like sheets. Also, the work pieces can be fabricated from a variety of materials. For example, the work pieces can be fabricated from a variety of ferromagnetic materials $WP_f$, such as, a variety of steels and steel alloys, iron or nickel. The work pieces can also be fabricated from a variety of non-ferromagnetic materials $WP_{nf}$, such as aluminum, glass, wood or plastic, for example.

Figure 1:
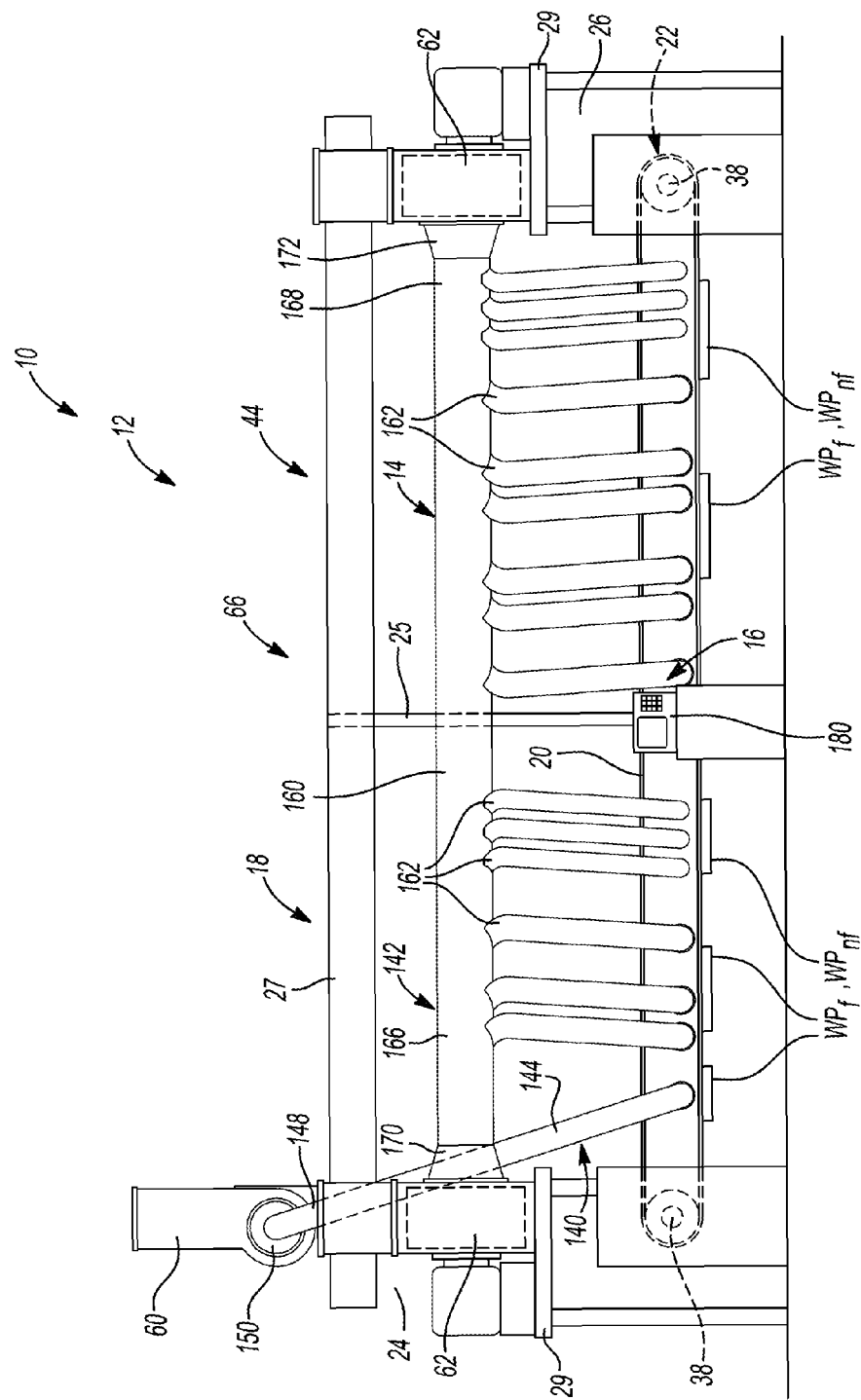
FIG. 1 is a schematic front view of an overhead conveyor system according to the present disclosure.

With specific reference to FIG. 1, the overhead conveyor system 10 of the present disclosure comprises a conveyor assembly 12 for transporting the work pieces $WP_f$, $WP_{nf}$ from one location to another; a retaining system 14 for lifting and vertically retaining the work pieces $WP_f$, $WP_{nf}$ on the conveyor assembly 12 during transport; and a stacker unit 16 that is in communication with both the conveyor assembly 12 and the retaining system 14 for controlling the location where the work pieces $WP_f$, $WP_{nf}$ are transported to.

The conveyor assembly 12 can generally comprise a frame 18, at least one conveyor belt 20, and a drive mechanism 22.

The frame 18 can be a steel structure having a first end 24, an oppositely located second end 26, and a center portion 25 located intermediate the first end 24 and the second end 26. The frame 18 can include a top platform 27 and a pair of second, lower platforms 29. Each of the second, lower platforms 29 can be located below the top platform 27 and at opposite ends 24, 26 of the frame 18. As will be described throughout the present disclosure, the conveyor belt 20, the drive mechanism 22, the retaining system 14, and the stacker unit 16 can all be supported on the frame 18.

The conveyor belt 20 can be a closed-looped overhead conveyor belts having an inner surface 28 and an outer surface 30. During operation, the work pieces $WP_f$, $WP_{nf}$ can be lifted and vertically retained against the outer surfaces 30 of the conveyor belts 20. The conveyor belt 20 can extend horizontally across the frame 18 between the first end 24 and the second end 26 and below each of the second, lower platforms 29. It should be understood that the conveyor assembly 12 can include any number of closed-loop overhead conveyer belts 20 (e.g. one, three, six, etc. conveyor belts 20). For example, two conveyor belts 20 are shown in FIG. 3 and four conveyor belts 20 are shown in FIG. 4.

Figure 3:
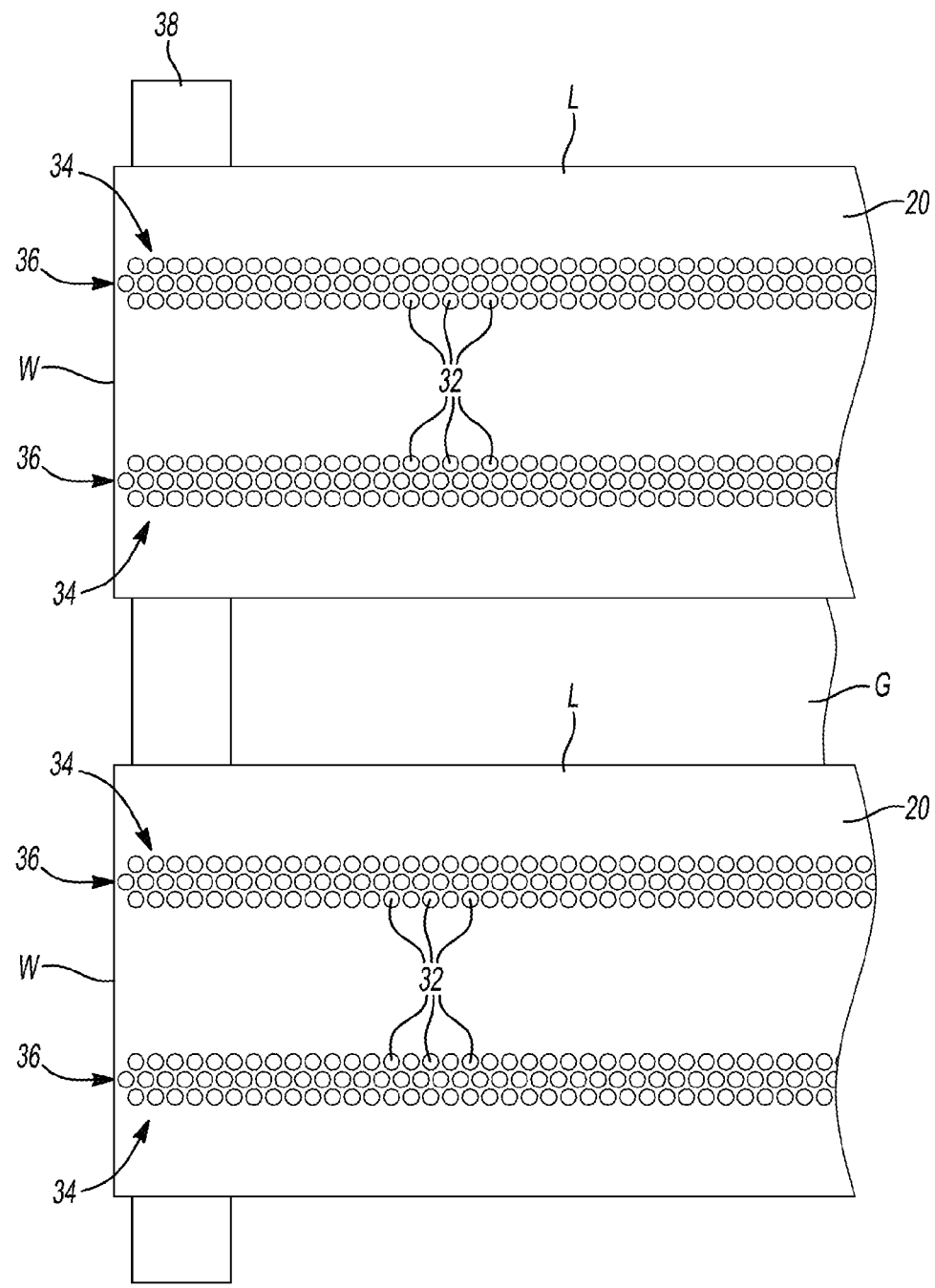
FIG. 3 is a partial schematic plan view in the direction of arrow A of FIG. 2 showing a conveyor according to the present disclosure.
Figure 4:
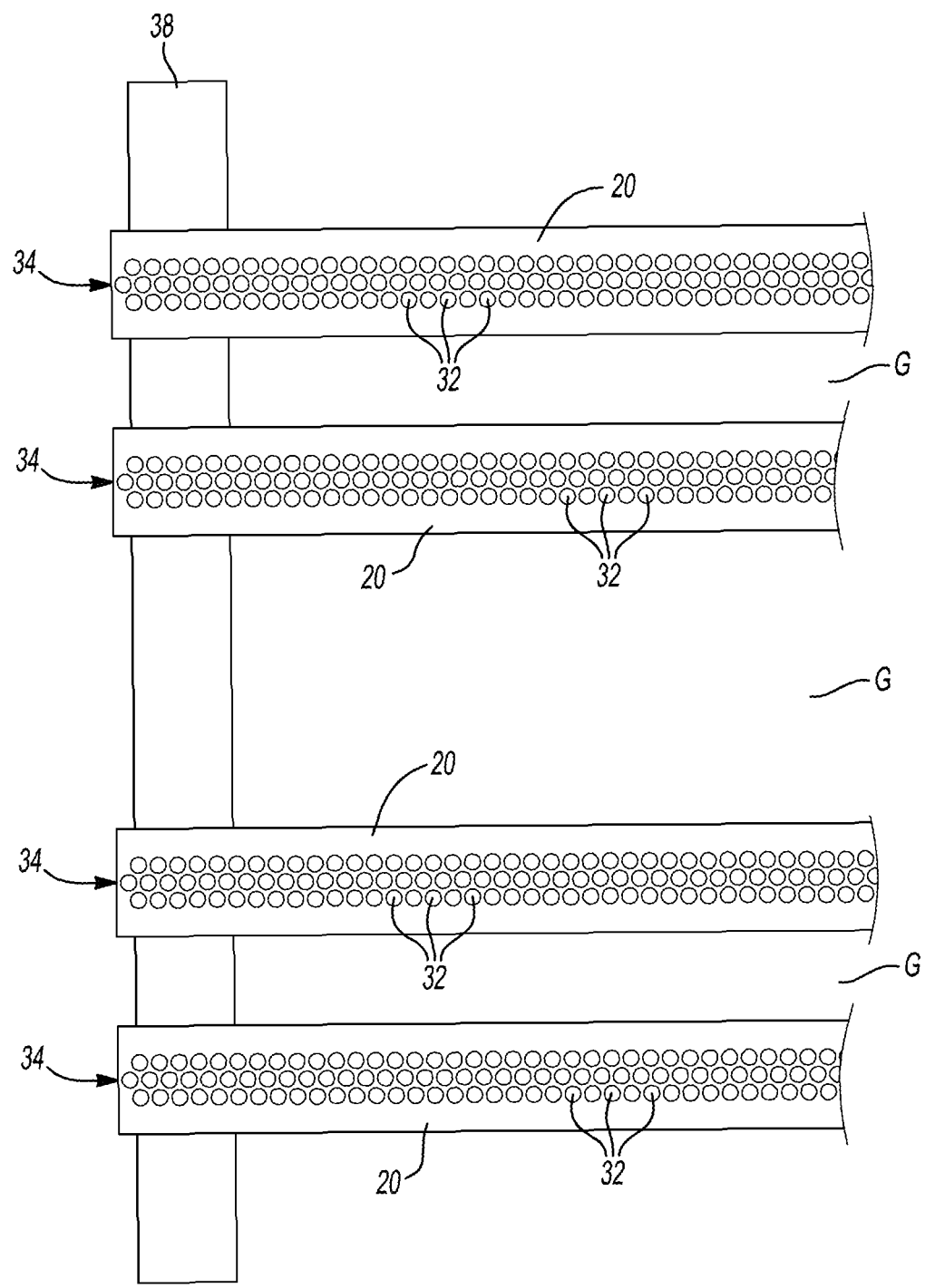
FIG. 4 is a partial schematic plan view in the direction of arrow A of FIG. 2 showing another conveyor according to the present disclosure.

In one exemplary configuration illustrated in FIGS. 2 and 3, the conveyor belts 20 can be fabricated from a nylon or a polyester material having a material thickness T (e.g., on the order of approximately 0.068 inches), a width W (e.g., on the order of approximately 32 inches) and length L (e.g., on the order of approximately 1130 inches). However, it should be understood that the material thickness T, the width W, and the length L of the conveyor belts 20 can vary. For example, in some configurations, the width W each conveyor belt 20 can be smaller than 32 inches (e.g. on the order of 6 inches, 10 inches, etc.) or larger than 32 inches (e.g., on the order of 40 inches, 50 inches, etc.). Also, in some configurations, one, some, or all of the conveyor belts 20 can comprise a V-shaped notch disposed through the material thickness T. A plurality of ferromagnetic steel inserts (not illustrated) can be disposed within the material thickness T of each conveyor belt 20 that, as will be described below, can cooperate with the retaining system 14 to help guide the conveyor belts 20 during operation.

With reference to FIG. 3, the conveyor belts 20 can include a plurality of openings or orifices 32 that pass through the material thickness T of the conveyor belts 20. For example, a pair of generally parallel groupings 34 of circular orifices 32 can be disposed in each conveyor belt 20. During operation, the orifices 32 provide a passageway for vacuum V drawn by the retaining system 14 to pass through the material thickness T of the conveyor belts 20 and lift and vertically retain the non-ferromagnetic work pieces $WP_{nf}$, (and/or the ferromagnetic work pieces $WP_f$ in an alternative operating mode, as will be described further below) against the outer surfaces 30 of the conveyor belts 20. In each parallel grouping 34, the orifices 32 can be arranged in a 60 degree staggered pattern, forming three generally parallel rows 36 extending along the entire length L of each conveyor belt 20. It is understood, however, that each conveyor belt 20 can include any number of groupings 34 of orifices 32 (e.g. one, three, four, etc.). For example, briefly referring to FIG. 4, each conveyor belt 20 includes one grouping 34 of circular orifices 32. It is also understood that the angular orientation and pattern of the orifices 32 in each grouping 34 can vary (e.g., 30 degrees, 45 degrees, 90 degrees, etc.). Moreover, while each orifice 32 includes a diameter on the order of about 0.50 inches, the diameter of each orifice 32 can be smaller or larger than 0.50 inches (e.g., on the order of about 0.25 inch, 0.75 inch, 1.00 inch, etc.).

With reference to FIGS. 1-5, the drive mechanism 22 can be coupled to the frame 18. The drive mechanism 22 enables the conveyor belts 20 to rotate and move along an endless looped-path P between the first and second ends 24, 26 of the frame 18. The drive mechanism 22 can comprise a pair of pulleys 38 and a power source 40. One pulley 38 can be coupled to each of the opposing ends 24, 26 of the frame 18, below each of the second, lower platforms 29. The conveyor belts 20 can be disposed about the oppositely coupled pulleys 38 such that the conveyor belts 20 are generally taut. Further, the conveyor belts 20 can be disposed about the pulleys 38 in a parallel manner such that a gap G is formed between the conveyor belts 20, as is more clearly illustrated in FIGS. 3-5; however, it is understood that the conveyor belts 20 can also be disposed about the pulleys 38 such that no gap G is formed between the conveyor belts 20. It is further understood that while FIGS. 2-5 generally illustrate a single pulley 38 coupled to an end of the frame 18, and more than one conveyor belt 20 coupled to the single pulley 38, the drive mechanism 22 can include multiple pulleys 38 coupled to one or both ends 24, 26 of the frame 18, and one or more conveyor belts 20 can be coupled to each pulley 38.

The power source 40 can be coupled to either one or more of the pulleys 38. The power source 40 can generate and transfer power to the pulley(s) 38 coupled thereto, causing the pulley(s) 38 to rotate. If the power source 40 is coupled to only one of the pulleys 38, the other pulley(s) 38 can rotate feely and help guide the conveyor belts 20 as they move along the endless looped-path P. As illustrated in FIG. 2, the power source 40 is coupled to only one of the pulleys 38.

The power source 40 can also be adjustable. More specifically, for example, the stacker unit 16 described further below can be in communication with the power source 40 and can vary the amount power generated by the power source 40 and transferred to the pulley(s) 38. By varying the amount of power transferred from the power source 40 to the pulley(s) 38, the stacker unit 16 can adjust the rate at which the conveyor belts 20 move along the endless looped-path P.

As outlined above, the overhead conveyor system 10 also comprises the retaining system 14. During operation of the overhead conveyor system 10 in one of the plurality of operating modes described below, the retaining system 14 can lift and vertically retain the ferromagnetic work pieces $WP_f$ and/or the non-ferromagnetic work pieces $WP_{nf}$ against the outer surfaces 30 of the moving conveyor belts 20. The retaining system 14 comprises a magnetic system 42 and a vacuum system 44. Generally, the magnetic system 42 can lift and vertically retain the ferromagnetic work pieces $WP_f$ against the outer surface(s) 30 of the moving conveyor belt(s) 20, and the vacuum system 44 can lift and vertically retain non-ferromagnetic work pieces $WP_{nf}$ against the outer surfaces 30 of the moving conveyor belts 20. However, it should be understood that in an alternate operating mode described further below, the vacuum system 44 can also lift and vertically retain ferromagnetic work pieces $WP_f$ against the outer surface(s) 30 of the moving conveyor belt(s) 20.

Figure 6:
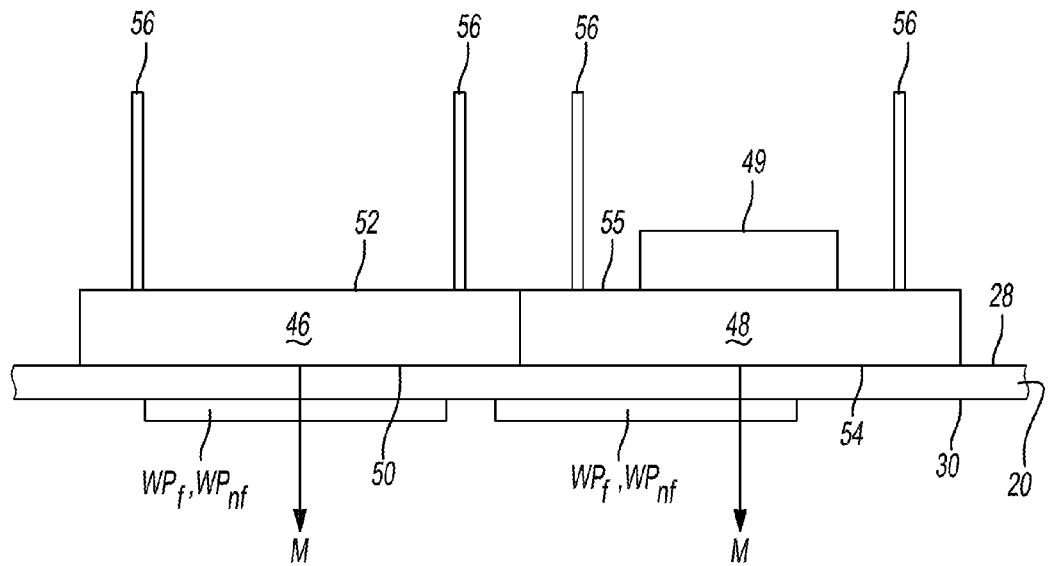
FIG. 6 is a schematic side view of a magnetic unit for the overhead conveyor system according to the present disclosure.

Referring to FIGS. 2 and 6, the magnetic system 42 comprises a plurality of permanent magnets 46 and a plurality of switchable magnets 48. Each permanent magnet 46 comprises a rectangular body having a smooth, generally flat bottom surface 50 and a top surface 52 that is located opposite the bottom surface 50. In an alternate embodiment, the bottom surface 50 can include a V-shaped notch that can complement the alternate embodiment of the conveyor belt 20 including the V-shaped notch described above. Each permanent magnet 46 can generate a constant and uninterrupted magnetic force M that is directed downwardly and away from the bottom surface 50. The magnetic force M can be on the order of approximately 7 to 125 pounds at a distance of approximately $\frac{1}{16}$-$\frac{1}{2}$ inch, for example. The magnetic force M can attract ferromagnetic materials, like, for example, the steel inserts that are disposed within the material thickness T the conveyor belts 20 and the ferromagnetic work pieces $WP_f$. An industry example of the permanent magnet 46 is a neodymium magnet. As will be described below, the permanent magnets 46 can be coupled to the frame 18 such that the bottom surface 50 of each permanent magnet 46 faces the inner surface 28 of a corresponding conveyor belt 20.

Referring specifically to FIG. 6, like the permanent magnets 46 described above, each switchable magnet 48 can also include a rectangular body having a smooth, flat bottom surface 54 and a top surface 55 that is located opposite the bottom surface 54. In an alternate embodiment, the bottom surface 54 can include a V-shaped notch that can complement the alternate embodiment of the conveyor belts 20 including the V-shaped notch described above. Each switchable magnet 48 can also generate a magnetic force M that is directed downwardly and away from the bottom surface 54. The magnetic force M generated by the switchable magnets 48 can also attract ferromagnetic materials, like, for example, the steel inserts disposed within the material thickness T of the conveyor belts 20 and the ferromagnetic work pieces $WP_f$. The magnetic force M generated by the switchable magnets 48 can be the same as the magnetic force M generated by the permanent magnets 46 described above, or can be different. As will be described below, the switchable magnets 48 can also coupled to the frame 18 such that the bottom surfaces 54 of the switchable magnets 48 face the inner surface 28 of a corresponding conveyor belt 20.

Unlike the permanent magnets 46, however, disposed about each of the switchable magnets 48 can be a coil 49 that is in communication with the stacker unit 16. Each coil 49 can be made operable to receive an electrical current or signal supplied by the stacker unit 16 to become energized. Once energized, the coil 49 can neutralize and interrupt the magnetic force M generated by the respective switchable magnet 48 about which it is disposed, as is known in the field. In contrast, when the coil 49 does not receive the electrical current or signal from the stacker unit 16, the magnetic force M generated by the respective switchable magnet 48 about which it is disposed is neither neutralized nor interrupted.

One or a plurality of mounting members 56 can be coupled to the top surface 52, 55 of each magnet 46, 48, respectively. The mounting members 56 can include a bolt and nut, for example, and provide a means for coupling, arranging, and adjusting the magnets 46, 48 on the frame 18. Alternatively, or in addition to one or both of the mounting members 56, one or more hangers 72, 74, 272, 274, 372, 374 described further below can provide a means for coupling, arranging, and adjusting the magnets 46, 48 on the frame 18.

Figure 5:
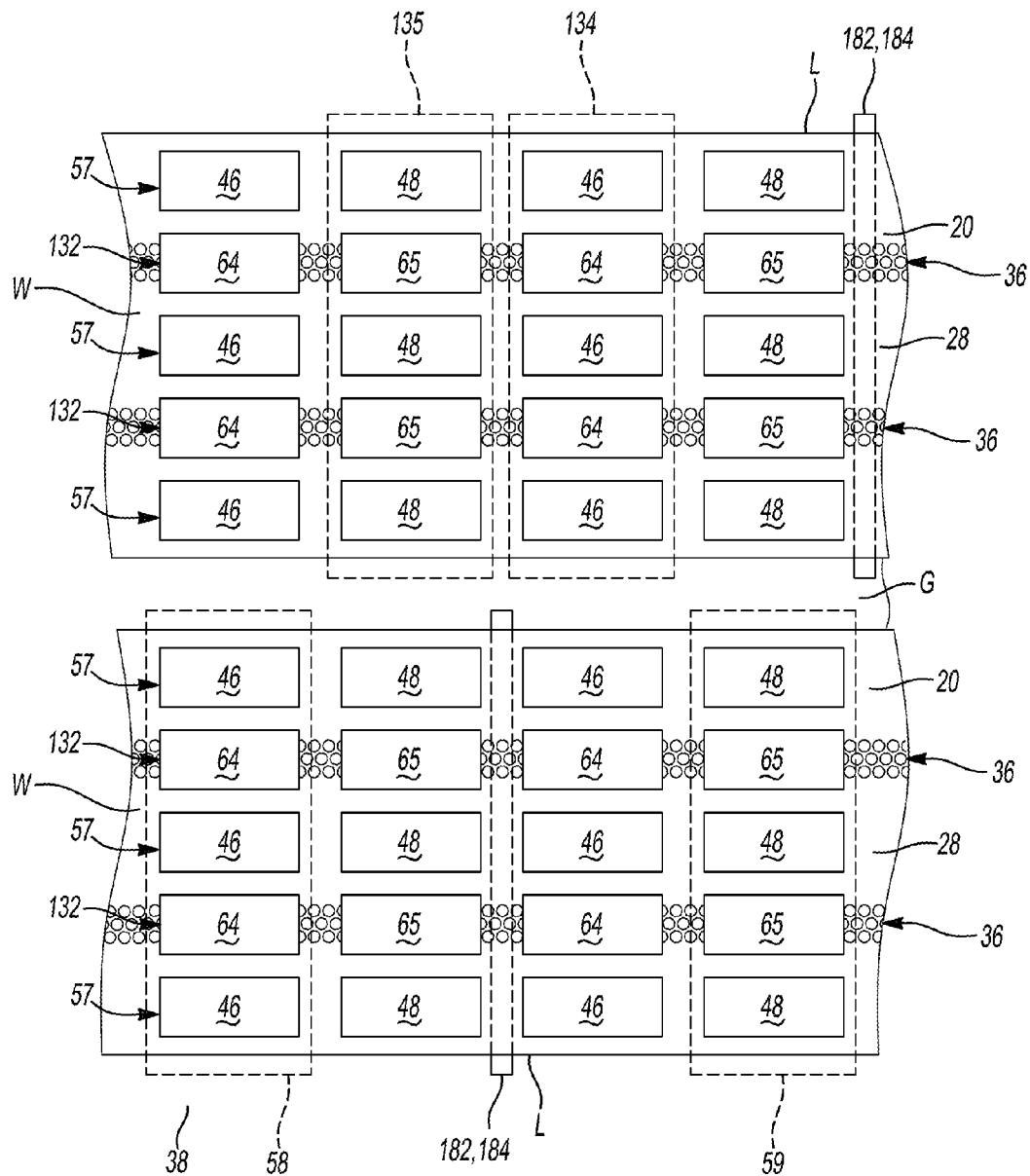
FIG. 5 is a partial schematic plan view in the direction of arrow B of FIG. 2 showing a conveyor according to the present disclosure.

The magnets 46, 48 can be arranged on the frame 18 to accommodate the work pieces $WP_f$ being transported. For example, one configuration illustrated in FIG. 5, shows the magnets 46, 48 alternatingly arranged on the frame 18 in six generally parallel rows 57. Each row 57 of magnets 46, 48 extends horizontally across the frame 18, between the first end 24 and the second end 26. In other words, between the first end 24 and the second end 26 of the frame 18, and along the entire length L of the conveyor belts 20, in each row 57, an end of one permanent magnet 46 can abut or be located adjacent an end of one switchable magnet 48. It is understood, however, that the total number of rows 57 of magnets 46, 48 extending horizontally across the frame 18 can vary. In other configurations, one, two, four, six, etc. rows 57 of magnets 46, 48 can be arranged per conveyor belt 20. Further, while the magnets 46, 48 described and illustrated in FIG. 5 are alternatingly arranged in each row 57, it is understood that the magnets 46, 48 can be arranged otherwise. For example, one, two, four etc. permanent magnets 46 can be sequentially arranged between one, two, four. etc. switchable magnets 48, and/or interchangeably arranged with one or more vacuum units 64, 65 described further below. The mounting members 56 (and/or the hangers 72, 74, 272, 274, 372, 374 described below, if applicable) can be adjusted such that bottom surfaces 50, 54 of the magnets 46, 48, respectively, are arranged in the same plane.

As a result of the arrangement of magnets 46, 48 shown in FIG. 5, a plurality of permanent magnet groupings 58 and a plurality of switchable magnet groupings 59 are formed across the width W of each conveyor belt 20. More specifically, across the width W of each conveyor belt 20, each permanent magnet grouping 58 comprises three permanent magnets 46, and each switchable magnet grouping 59 comprises three switchable magnets 48. It is understood, however, that the number of permanent magnets 46 and the number of switchable magnets 48 in each grouping 58, 59 will vary depending on the number of rows 57 of magnets 46, 48 incorporated and the specific arrangement of magnets 46, 48 in each row 57. It is further understood that the number and frequency of groupings 58, 59 along the length L of the conveyor belts 20 will vary depending on the number and arrangement of magnets 46, 48 in each row 57.

As outlined above, in addition to the magnetic system 42, the retaining system 14 also comprises the vacuum system 44. During operation, the vacuum system 44 can lift and vertically retain non-ferromagnetic work pieces $WP_{nf}$ against the outer surfaces 30 of the moving conveyor belts 20. It should be understood, however, that in an alternate operating mode, as will be described further below, the vacuum system 44 can also lift and vertically retain ferromagnetic work pieces $WP_f$ against the outer surfaces 30 of the moving conveyor belts 20. Generally, the vacuum system 44 comprises a first vacuum generator 60, a pair of second vacuum generators 62, a plurality of permanent vacuum units 64, a plurality of switchable vacuum units 65, and a duct system 66.

The first vacuum generator 60 and each of the second vacuum generators 62 can be conventional vacuum pumps or blowers that are known in the field. Referring back to FIG. 1, the first vacuum generator 60 can be arranged on the top platform 27 of the frame 18, near the first end 24. Each of the second vacuum generators 62 can be arranged on each of the second, lower platforms 29, located at the opposite ends 24, 26 of the frame 18. During operation, as will be described further below, using the duct system 66, the vacuum generator(s) 60, 62 can draw or pull vacuum V through the permanent vacuum units 64 and the switchable vacuum units 65. The vacuum V pulled through the vacuum units 64, 65 can be on the order of approximately 0.4-0.6 psi; however, levels up to 2 psi can be envisioned.

With reference to FIGS. 7-12, the permanent vacuum units 64 and the switchable vacuum units 65 can each include a base 68, a pair of valve assemblies 70 and a first and a second hanger 72, 74.

The base 68 can be a rectangular and hollow structure comprising a bottom surface 76 and a top surface 78 that is located opposite the bottom surface 76. In an alternate embodiment, the bottom surface 76 can include a V-shaped notch that can complement the alternate embodiment of the conveyor belts 20 including a V-shaped notch described above. A divider wall 80, illustrated in FIG. 9, can be disposed between the bottom surface 76 and the top surface 78 to form two individual chambers 82 within the hollow base 68. The chambers 82 can generally be of equal sizes, and each chamber 82 can be sealed from the other.

Figure 8:
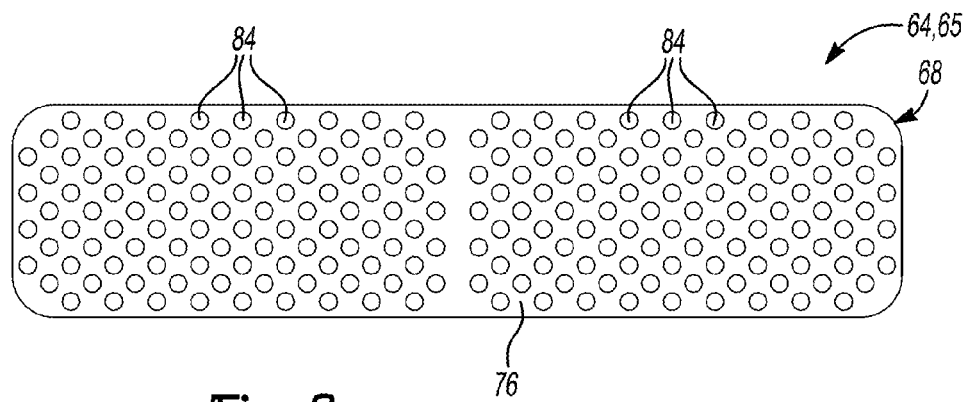
FIG. 8 is a schematic bottom view of the vacuum unit of FIG. 7.
Figure 9:
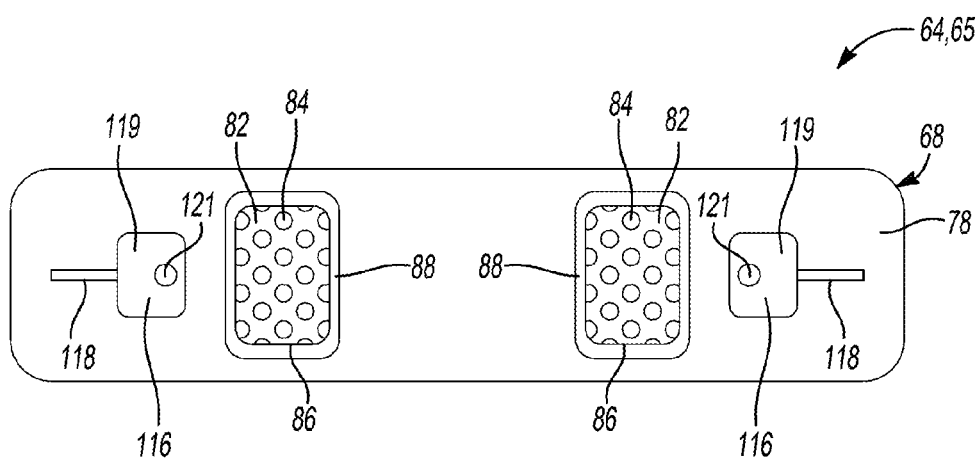
FIG. 9 is a schematic top view of a base of the vacuum unit of FIG. 7.
Figure 10:
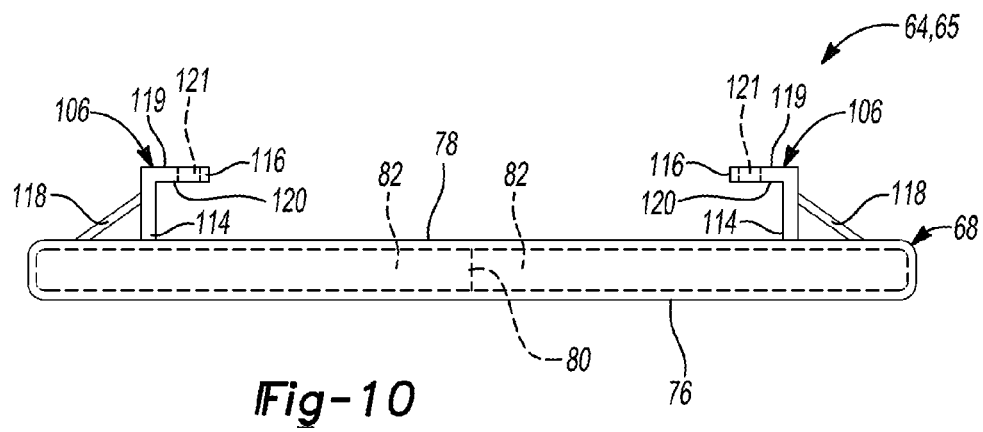
FIG. 10 is a schematic side view of the base the vacuum unit of FIG. 7.

The bottom surface 76 can be generally flat and smooth and can include a plurality of apertures 84. As illustrated in FIGS. 8 and 9, the apertures 84 can be arranged in a 60 degree staggered pattern. Alternatively, the apertures 84 can be arranged in other patterns, such as a 45 or 90 degree pattern, or can be randomly staggered about the bottom surface 76. The apertures 84 can be larger than the orifices 32 that are disposed through the material thickness T of the conveyor belts 20 described above, or can be the same size or smaller than the orifices 32. As perhaps best shown in FIG. 9, disposed through the top surface 78 of the base 68 are two ports 86. More specifically, each port 86 is located atop each chamber 82, and each port 86 provides a passageway into each respective chamber 82. A gasket 88 can be disposed around each port 86 to provide a seal between the top surface 78 and each valve assembly 70, described below.

Figure 7:
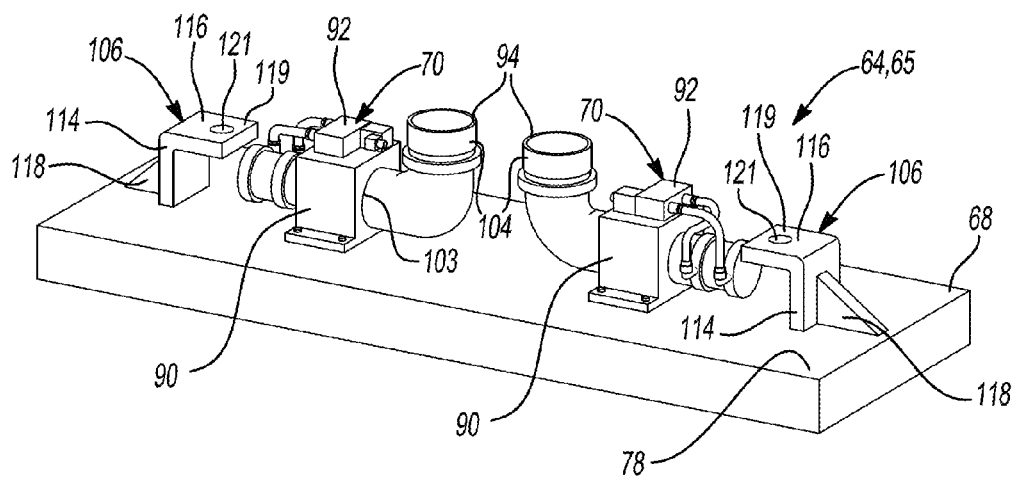
FIG. 7 is a perspective view of a vacuum unit for the overhead conveyor system according to the present disclosure.
Figure 11:
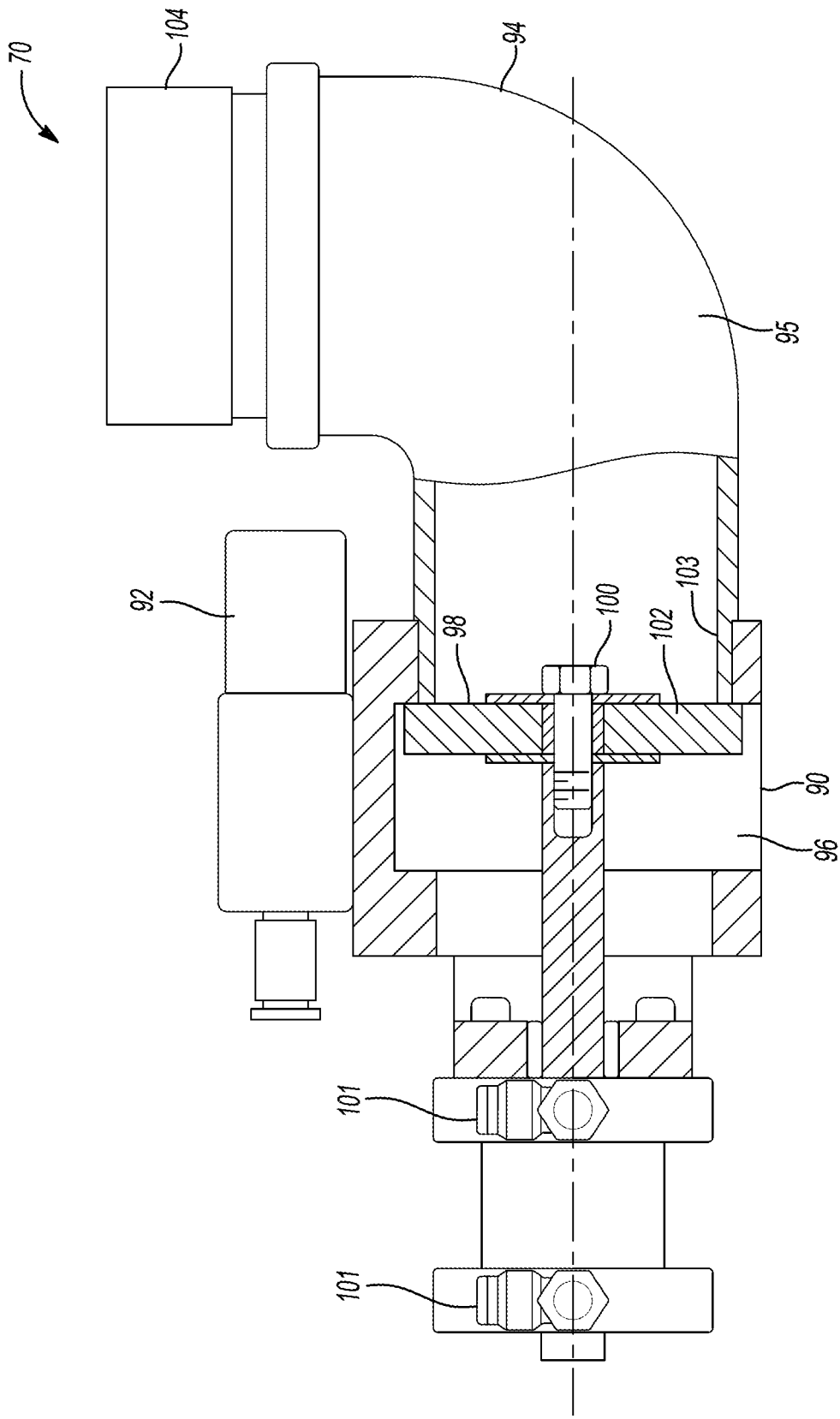
FIG. 11 is a schematic front view of a valve assembly for the vacuum unit of FIG. 7.

With reference to FIGS. 7 and 11, each valve assembly 70 can comprise a valve body 90, a valve controller 92 and an intake elbow 94. The valve body 90 comprises a generally hollow cylinder 96 and, located within the cylinder 96, comprises a sealing surface 98 and a valve 100. Using air poppet valves 101, for example, the valve controller 92 further described below can control the valve 100. That is, during operation, the valve controller 92 can move the valve 100 between a closed position 102, where the valve 100 is sealed against the sealing surface 98 (illustrated in FIG. 11), and an open position, where the valve 100 is not sealed against the sealing surface 98. Further, the valve controller 92 can maintain the valve 100 in the closed position 102 or in the open position. In another embodiment, a magnetic solenoid valve can control and move the valve 100. As will be described further below, when the valve 100 is in the closed position 102, one or more of the vacuum generators 60, 62 are unable to pull vacuum through the valve body 90 and through the chamber 82 upon which the valve assembly 70 is disposed. In contrast, when the valve 100 is in the open position, one or more of the vacuum generators 60, 62 are able to pull vacuum V through the valve body 90 and through the chamber 82 upon which the valve assembly 70 is disposed.

Each valve controller 92 located on the switchable vacuum units 65 can be in communication with the stacker unit 16. More specifically, during operation, the stacker unit 16 can control and regulate the vacuum V being pulled through the chambers 82 of the switchable vacuum units 65 by moving the valves 100 between the closed position 102 and the open position. In contrast, the valve controllers 92 located on the permanent vacuum units 64 can maintain the valves 100 in the open position such that vacuum V can be constantly pulled through the chamber sections 82 by one or more of the vacuum generators 60, 62.

The intake elbow 94 is a generally hollow and cylindrical member comprising a first end 103, a second end 104 and an elbow bend 95. At the first end 103, the intake elbow 94 can be coupled to the valve body 90, and at the second end 104, the intake elbow 94 can be ultimately coupled to one or more of the vacuum generators 60, 62, as will be, described below.

With specific reference to only the switchable vacuum units 65, during operation, the elbow bend 95 can provide an area for a volume of vacuum V drawn or pulled by one or more of the vacuum generators 60, 62 to be temporarily stored once the valve 100 is moved from the open position to the closed position 102. By maintaining a volume of temporarily stored vacuum V, the vacuum system 44 can quickly recover pulling vacuum V through the chambers 82 of the switchable vacuum units 65 once the valve 100 is moved into the open position from the closed position 102.

The first and the second hangers 72, 74 can be coupled to the top surface 78 of each vacuum unit 64, 65 and can provide a means for coupling, arranging, and adjusting the position of the vacuum units 64, 65 on the frame 18. As perhaps best shown in FIG. 12, the hangers 72, 74 can be mirror images of one another and can include an L-shaped flange 106, a threaded bolt 108, and an upper bracket 112. A common lower bracket 110 can be shared between the hangers 72, 74 of two adjacent vacuum units 64, 65.

The L-shaped flange 106 can include a vertical portion 114, a horizontal portion 116, and a gusset 118. A proximate end of the vertical portion 114 can be coupled to the top surface 78 of the base 68. The horizontal portion 116 can be cantilevered from a distal end of the vertical portion 114 and can comprise a top surface 119 and a bottom surface 120. The horizontal portion 116 can further include an aperture 121 disposed through the top and bottom surfaces 119, 120 that is sized to receive the threaded bolt 108. The gusset 118 can add strength to the L-shaped flange 106 by further coupling the vertical portion 114 to the top surface 78 of the base 68.

Figure 12:
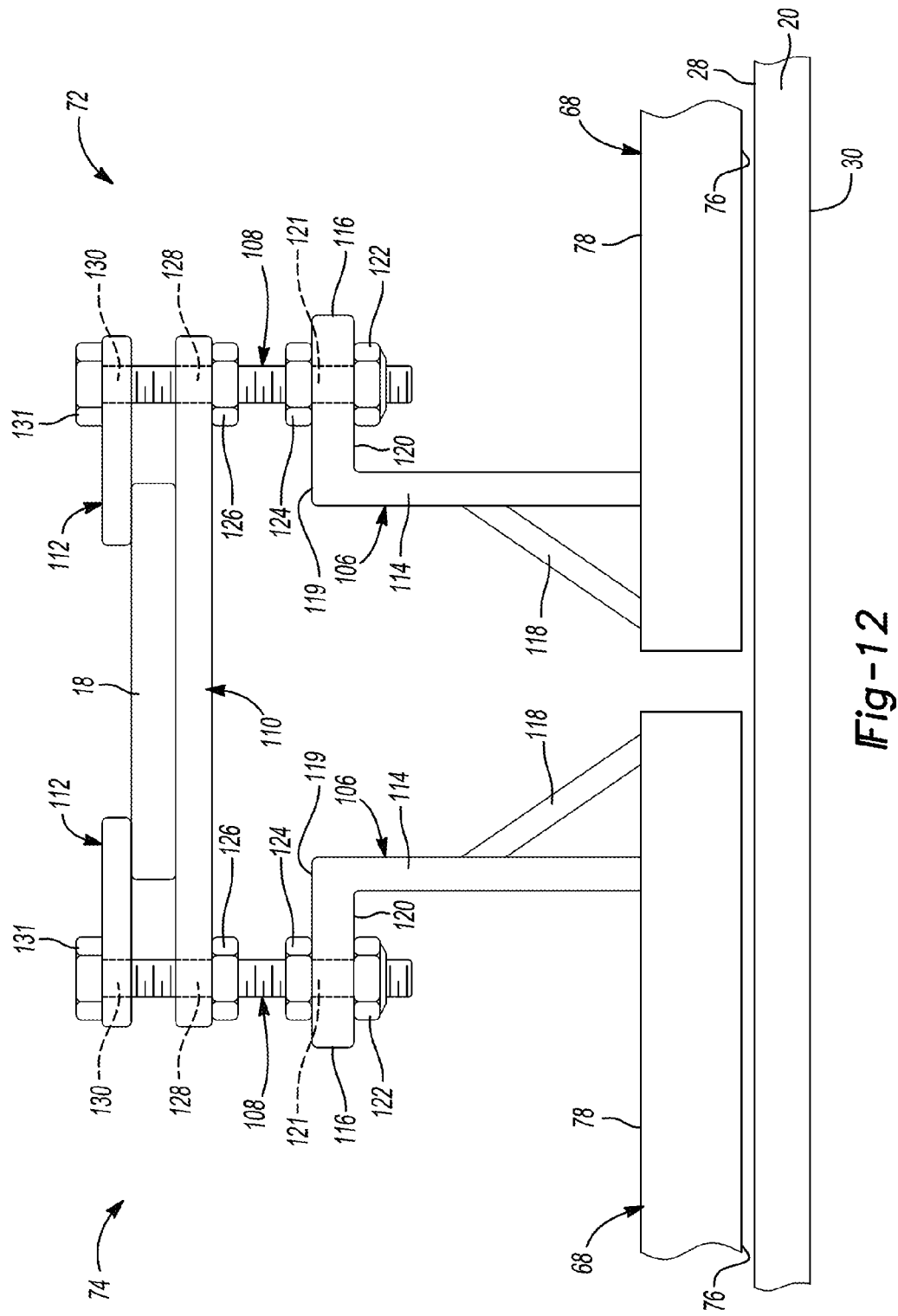
FIG. 12 is a partial front view of a first and a second hanger the magnetic unit of FIG. 6 and/or for the vacuum unit of FIG. 7.

A lock nut 122 and a first jam nut 124 can be threaded onto a proximate end of the threaded bolt 108 to secure the threaded bolt 108 to the horizontal portion 116. More specifically, as illustrated in FIG. 12, the lock nut 122 can secure the threaded bolt 108 against the bottom surface 120 of the horizontal portion 116 and the first jam nut 124 can secure the threaded bolt 108 against the top surface 119. A second jam nut 126 can positioned above the first jam nut 124, towards a center portion of the threaded bolt 108. The second jam nut 126 can support the lower bracket 110.

The lower bracket 110 can be a rectangular member fabricated from a metal, such as steel. The lower bracket 110 can comprise a pair of opposing circular apertures 128. As briefly described above, the lower bracket 110 can be shared between the hangers 72, 74 of two adjacent vacuum units 64, 65. The lower bracket 110 can aid in coupling the two vacuum units 64, 65 to one another and to the frame 18. More specifically, the threaded bolts 108 from each hanger 72, 74 can pass through one of the apertures 128 in the lower bracket 110.

Located above the lower bracket 110 is the upper bracket 112. The upper bracket 112 can also be a rectangular member fabricated from a metal, such as steel. The upper bracket 112 can include a single aperture 130 that is sized to allow a distal end of the threaded bolt 108 to pass through. Located at the very distal end of the threaded bolt 108 can be a cap 131 such as a hex cap for example.

Attachment and the adjustment of the vacuum units 64, 65 to the frame 18 of the conveyor assembly 12 can be best understood with continued reference to FIG. 12. FIG. 12 illustrates that a portion of the frame 18 is disposed between the lower bracket 110 and the upper brackets 112. By loosening the nuts 122, 124, 126 and either rotating the threaded bolt 108 in a clockwise direction or in a counter-clockwise direction, the vertical positioning of each vacuum unit 64, 65, in relation to the inner surface 28 of the conveyor belts 20, can be adjusted. Once the desired vertical positioning of the vacuum units 64, 65 has been achieved, the nuts 122, 124, 126 can be tightened to maintain the positioning on the frame 18. In another embodiment, linear rails and/or bearings can be coupled between the vacuum units 64, 65 and the frame 18 for adjusting the horizontal arrangement of vacuum units 64, 65 across the frame 18.

Figure 13:
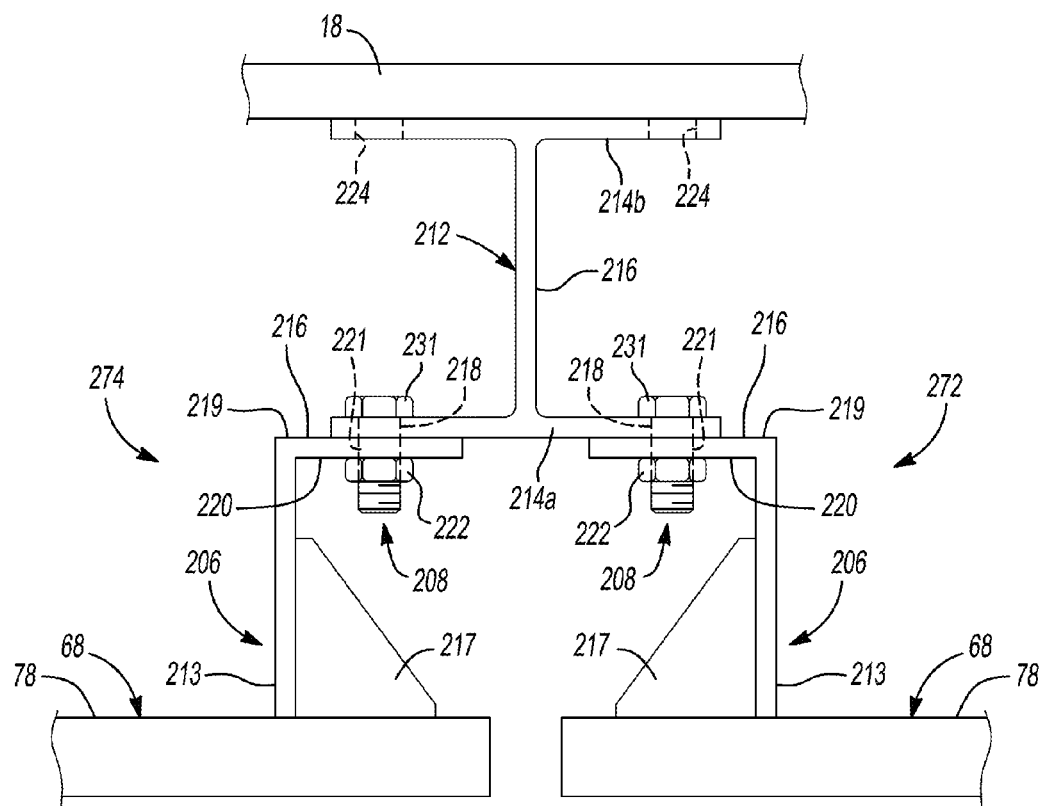
FIG. 13 is another partial front view of a first and a second hanger for the magnetic unit of FIG. 6 and/or the vacuum unit of FIG. 7.

In another embodiment shown in FIG. 13, hangers 272, 274 can also be used to couple, arrange, and adjust the vacuum units 64, 65 to the frame 18. Hangers 272, 274 can be mirror images of one another and can generally include an L-shaped flange 206, a threaded bolt 208, and an I-shaped bracket 212.

The L-shaped flange 206 can include a vertical portion 213, a cantilevered horizontal portion 216 having a top surface 219 and opposing bottom surface 220, and a gusset 217. The horizontal portion 216 can further include an aperture 221 disposed through the top and bottom surfaces 219, 220 that is sized to receive the threaded bolt 208. The gusset 217 can add strength to the L-shaped flange 206 by further coupling the vertical portion 214 to the top surface 78 of the base 68. A lock nut 222 can be threaded onto the threaded bolt 208 to secure the threaded bolt 208 to the I-shaped bracket 212.

The I-shaped bracket 212 can include opposing upper and lower horizontal members 214a, 214b and a center vertical member 216 extending there between. The lower horizontal member 214a can include apertures 218 disposed on either side of the center vertical member 216. Each aperture 218 can be sized to allow one of the threaded bolts 208 to pass through. The opposite upper horizontal portion 214b can also include apertures 224 configured to receive mounting bolts (not illustrated) for coupling the I-shaped bracket 212 to the frame 18. It is understood that as an alternative to the apertures 224 and mounting bolts, or in addition thereto, other mounting means, such as welds and/or adhesives, can be used to couple the I-shaped bracket 212 to the frame 18. The vertical height of the vacuum units 64, 65 can be adjusted by placing spacers, such as washers, between the lower horizontal portion 214a and the upper surface 219 of the horizontal portion 216 of the L-shaped flange 206 and/or between the upper horizontal portion 214b and the frame 18.

Figure 14:
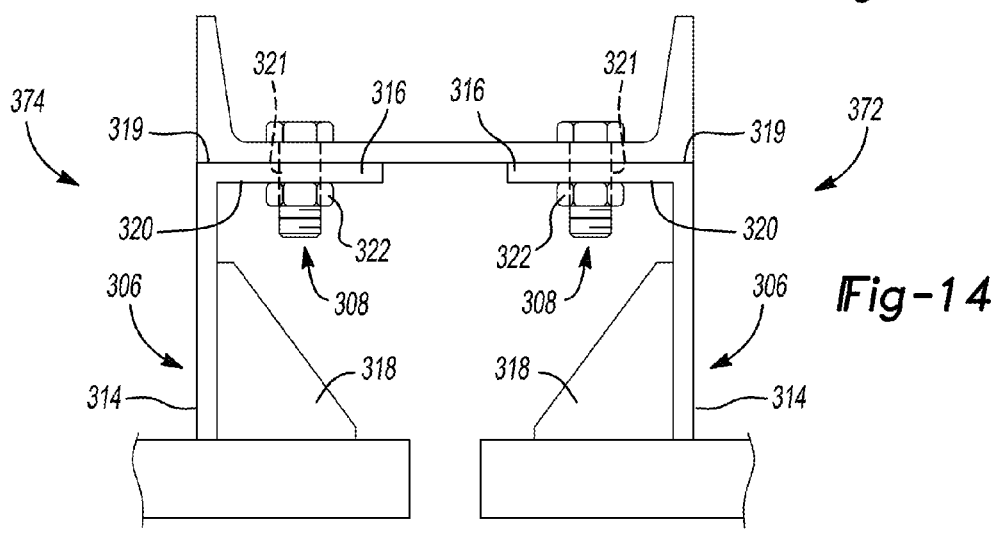
FIG. 14 is yet another partial front view of a first and a second hanger for the magnetic unit of FIG. 6 and/or the vacuum unit of FIG. 7.

In yet another embodiment shown in FIG. 14, hangers 372, 374 can be used to couple, arrange, and adjust the vacuum units 64, 65 on the frame 18. Hangers 372, 374 can be mirror images of one another and can generally include an L-shaped flange 306 and a threaded bolt 308.

Similar to the L-shaped flanges 106, 206 described above, L-shaped flange 306 can include a vertical portion 314, a cantilevered horizontal portion 316 having a top surface 319 and opposing bottom surface 320, and a gusset 318. The horizontal portion 316 can further include an aperture 321 sized to receive the threaded bolt 308. A lock nut 322 can be threaded onto the threaded bolt 308 to secure the threaded bolt 308 to the frame 18. The top surfaces 319 of the L-shaped flanges 306 can be placed against and secured to the frame 18 with the bolt 308 and lock nut 322. The vertical height of the vacuum units 64, 65 can be adjusted by placing spacers, such as washers, between the frame 18 and the upper surface 319 of the horizontal portion 316 of the L-shaped flange 306.

It is understood that one or more of the first and second hangers 72, 74, 272, 274, 372, 374 can be used to couple, arrange, and adjust the vacuum units 64, 65 on the frame 18. Also, alternatively and/or in addition to the hangers 72, 74, 272, 274, 372, 374, one or more of the mounting members 56 can be used to couple, arrange, and adjust the vacuum units 64, 65 on the frame 18. Further, while the previous descriptions were directed toward using the hangers 72, 74, 272, 274, 372, 374 to couple, arrange, and adjust the vacuum units 64, 65 on the frame 18, one or more of the hangers 72, 74, 272, 274, 372, 374 can also be used to couple arrange, and adjust the magnets 46, 48 on the frame 18.

The arrangement of the permanent vacuum units 64 and the switchable vacuum units 65 on the frame 18 will now be described. Referring back to FIG. 5, similar to the arrangement of the permanent magnets 46 and the switchable magnets 48 described above, the permanent vacuum units 64 and the switchable vacuum units 65 can also be alternatingly attached and arranged on the frame 18. The vacuum units 64, 65 can be alternatingly arranged in four generally parallel rows 132 extending horizontally across the frame 18 between the first end 24 and the second end 26. In other words, between the first end 24 and the second end 26 of the frame 18, and along the entire length L of the conveyor belts 20, in each row 132, an end of a permanent vacuum unit 64 can abut or be located adjacent an end of a switchable vacuum unit 65. It is understood that the total number of rows 132 extending horizontally across the frame 18 can vary. For example, while the arrangement shown in FIG. 5 includes two rows 132 of vacuum units 64, 65 per conveyor belt 20, one, three, four, six, etc. rows 132 of vacuum units 64, 65 can be arranged per conveyor belt 20. Further, while the vacuum units 64, 65 are shown and described as being alternatingly arranged in each row 132, it is understood that the vacuum units 64, 65 can be arranged otherwise. For example, two, four, five etc. permanent vacuum units 64 can be arranged in sequential groups with two, four, five, etc. switchable vacuum units 65 and/or can be arranged interchangeably and/or sequentially with the vacuum units 64, 65 described above.

Further, while each row 132 of vacuum units 64, 65 is shown arranged on the frame 18 intermediate two rows 57 of magnets 46, 48, it is understood that the arrangement of the rows 132 of vacuum units 64, 65 and the rows 57 of magnets 46, 48 can vary. For example, the rows 57, 132 can be alternatingly arranged across the width W of the conveyor belts 20 as shown, or the rows 57, 132 can be arranged such that two, three, four, etc. rows 57, 132 are sequentially arranged across the width W of the conveyor belts 20. It may be advantageous, however, for the rows 132 of vacuum units 64, 65 be arranged to correspond with the rows 36 of orifices 32 disposed through the thickness T of the conveyor belts 20. Further, while FIG. 5 illustrates a row 57 of magnets 46, 48 arranged at the outer edge of each conveyor belt 20, it is understood that one or more rows 132 of vacuum units 64, 65 can be arranged at the outer edge of each conveyor belt 20.

Additionally, the bottom surfaces 76 of each of the vacuum units 64, 65 can be arranged co-planar with one another and co-planar with the bottom surfaces 50, 54 of the magnets 46, 48. The bottom surfaces 76 of each of the vacuum units 64, 65 can be arranged to face the inner surfaces 28 of the conveyor belts 20, as illustrated in FIG. 12.

As a result of the aforementioned arrangement of the permanent vacuum units 64 and the switchable vacuum units 65, a plurality of permanent vacuum unit groupings 134 and a plurality of switchable vacuum unit groupings 135 are formed across the width W of each conveyor belt 20, as illustrated in FIG. 5. More specifically, across the width W of each conveyor belt 20, each permanent vacuum unit grouping 134 comprises two permanent vacuum units 64, and each switchable vacuum unit grouping 135 comprises two switchable vacuum units 65. It should be understood, however, that the number of permanent vacuum units 64 and the number of switchable vacuum units 65 located in each grouping 134, 135, respectively, will vary depending on the number rows 132 of vacuum units 64, 65 incorporated. Further, it is understood that the number and frequency of groupings 134, 135 along the length L of the conveyor belt(s) 20 will vary depending on the number and arrangement of vacuum units 64, 65 in each row 132.

In another embodiment, the frame 18 of the overhead conveyor system 10 can incorporate the permanent vacuum units 64 and the switchable vacuum units 65. In other words, the vacuum units 64, 65 can formed integral with the frame 18.

As outlined above, in addition to the vacuum generators 60, 62 and the vacuum units 64, 65, the vacuum system 44 also includes the duct system 66. As illustrated in FIGS. 1 and 15-17, the duct system 66 comprises a first duct network 140 and a second duct network 142. Generally, the duct system 66 is a network of hollow and interconnected passageways that connect the vacuum generators 60, 62 and the vacuum units 64, 65. More specifically, the duct system 66 is arranged to transfer vacuum V pulled by the vacuum generators 60, 62 through each of the chambers 82.

Figure 15:
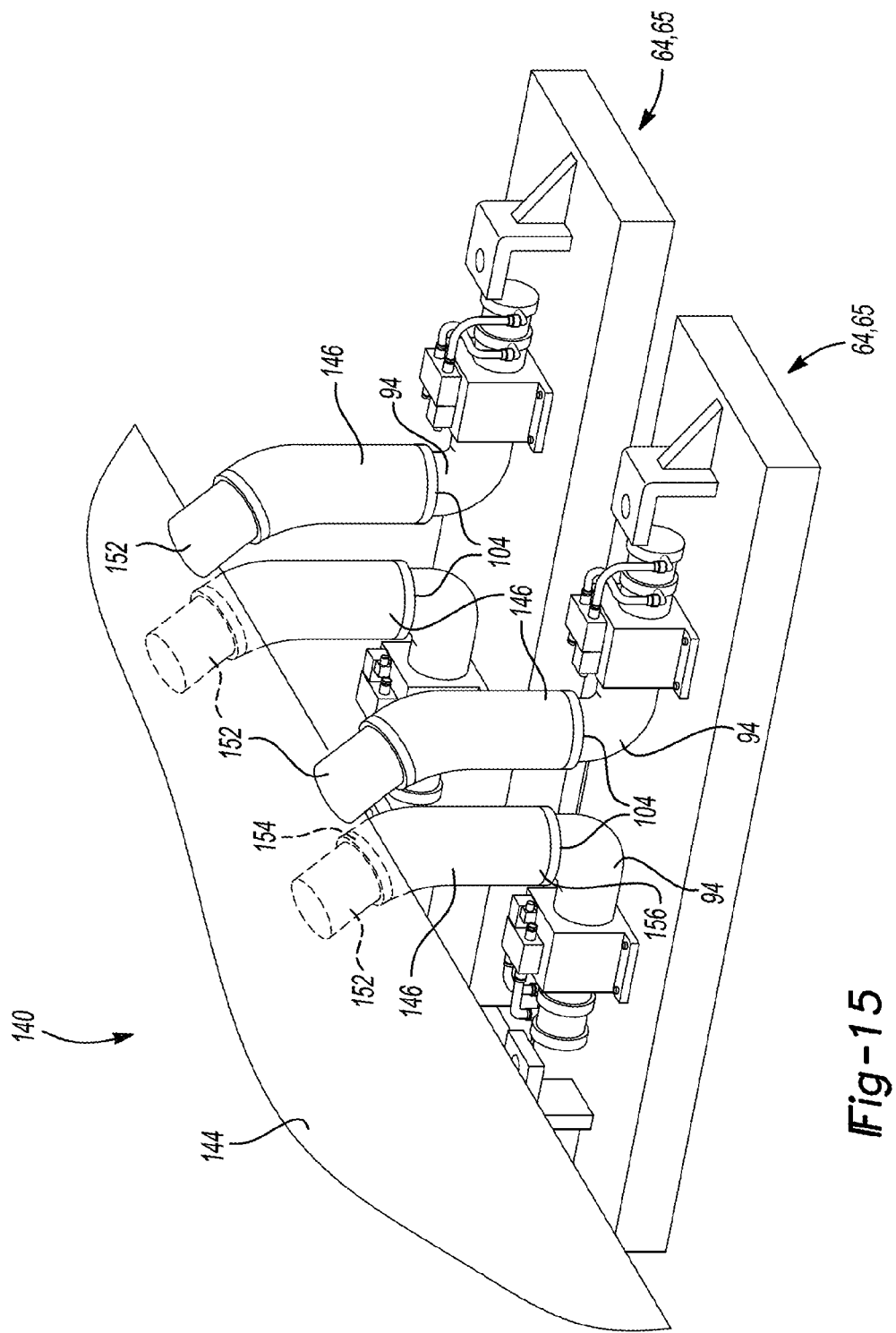
FIG. 15 is a partial perspective view of a duct system for the overhead conveyor system according to the present disclosure.

With specific reference to FIGS. 1 and 15, the first duct network 140 generally comprises a first distribution duct 144 and first vacuum lines 146. The first distribution duct 144 can be a hollow and generally cylindrical member that is fabricated from a thin-walled sheet material, like galvanized sheet metal. The first distribution duct 144 has a first end 148 and a second end (not illustrated). At the first end 148, the first distribution duct 144 can be attached to the first vacuum generator 60 with a conical mounting flange 150, for example. The opposite, second end can be capped shut, for example. The first distribution duct 144 can further include a series of ports 152, where the first vacuum lines 146 can be coupled.

The first vacuum lines 146 can be hollow and generally cylindrical members that are fabricated from a flexible plastic material disposed about a coiled wire reinforcement for example, or can be hollow and generally cylindrical members fabricated from a thin-walled sheet metal. Each of the first vacuum lines 146 includes a first end 154 and a second end 156. The first end 154 can be attached (e.g., bolted, welded, and/or clamped) to one of the ports 152 of the first distribution duct 144. The second end 156 can be attached (e.g., bolted, welded, and/or clamped) to one of the second ends 104 of one of the intake elbows 94 located on the vacuum units 64, 65 attached and arranged at and/or near the first end 24 of the frame 18.

Figure 16:
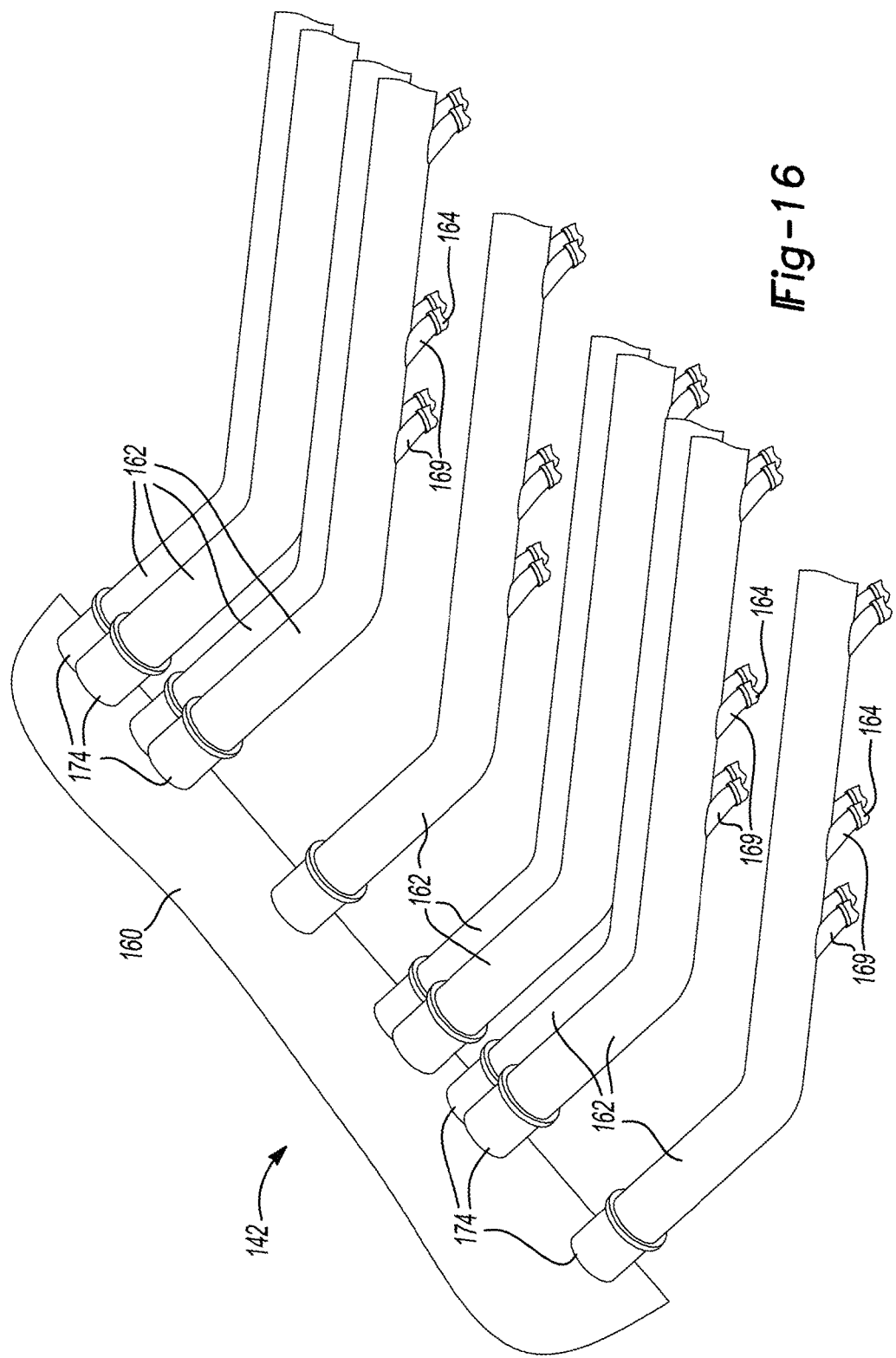
FIG. 16 is a partial perspective view of the duct system for the overhead conveyor system according to the present disclosure.
Figure 17:
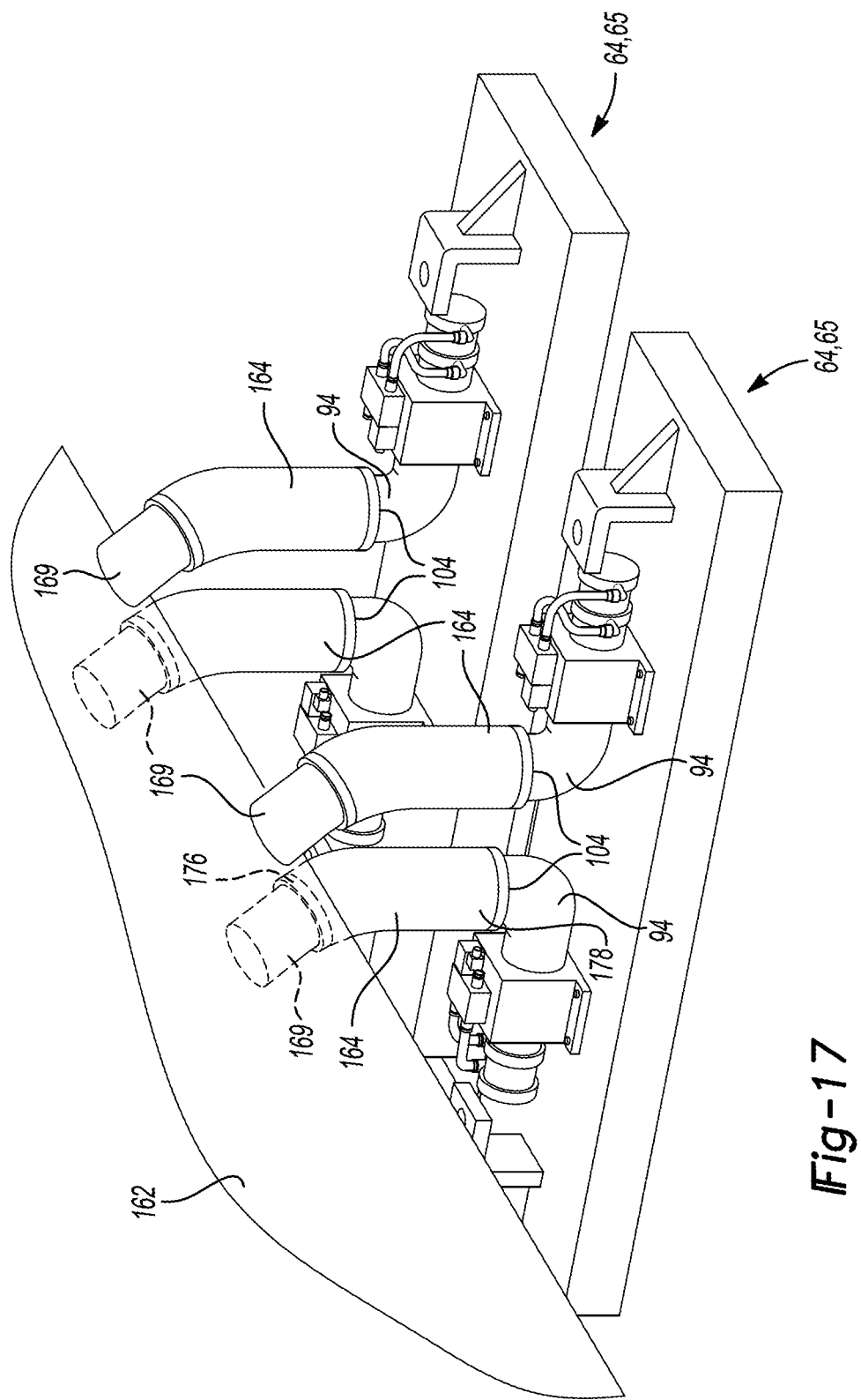
FIG. 17 is a partial perspective view of the duct system for the overhead conveyor system according to the present disclosure.

With specific reference to FIGS. 1, 16 and 17, the second duct network 142 comprises a header duct 160, second distribution ducts 162 and second vacuum lines 164.

The header duct 160 can be a hollow and generally cylindrical member that is fabricated from a thin-walled sheet material, like galvanized sheet metal for example. The header duct 160 has a first end 166 and a second end 168. The first end 166 of the header duct 160 can be attached with a conical mounting flange 170 for example to the second vacuum generator 62 that is located towards the first end 24 of the frame 18. The second end 168 of the header duct 160 can be attached with a second conical mounting flange 172 for example to the second vacuum generator 62 that is located towards the second end 26 of the frame 18. The header duct 160 can further include a series of ports 174, at which the second distribution ducts 162 can be coupled.

The second distribution ducts 162 can also be hollow and generally cylindrical members that are fabricated from a thin-walled sheet material, like galvanized sheet metal for example. The second distribution ducts 162 can be coupled (e.g., bolted, welded, and/or clamped) to the ports 174 located on the header duct 160. Each of the second distribution ducts 162 can further include a series of ports 169 at which the second vacuum lines 164 can be coupled.

Like the first vacuum lines 146 described above, the second vacuum lines 164 can also be hollow and generally cylindrical members that are fabricated from a flexible plastic material disposed about a coiled wire reinforcement for example, or can be hollow and generally cylindrical members fabricated from a thin-walled sheet metal. Each of the second vacuum lines 164 has a first end 176 and a second end 178. The first end 176 can be coupled (e.g., bolted, welded, and/or clamped) to one of the series of ports 169 located on the second distribution duct 162. The second end 178 can be attached (e.g., bolted, welded, and/or clamped) to one of the second ends 104 of one of the intake elbows 94 located on the vacuum units 64, 65 attached and arranged on the frame 18 at and/or near the center portion and extending towards the second end 26.

In another embodiment, the duct system 66 can comprise only the first duct network 140; that is, the duct system 66 can comprise the first distribution duct 144 coupled to the first vacuum generator 60, and the first vacuum lines 146 coupled to the first distribution duct 144. The first vacuum lines 146 can be coupled to each of the intake elbows 94 located on the vacuum units 64, 65 disposed between the first end 24 and the second end 26 of the frame 18.

In yet another embodiment, the duct system 66 can comprise only the second duct network 142; that is, the duct system 66 can comprise only the header duct 160 disposed between the two vacuum generators 62 located at opposite ends 24, 26 of the frame 18. The second distribution ducts 162 can be coupled to the header duct 160, and the second vacuum lines 164 coupled to the second distribution ducts 162. It is understood that in this other embodiment, the vacuum system 44 comprises neither the first vacuum generator 60 nor the first duct network 140. Instead, the second end 178 of each of the second vacuum lines 164 can be coupled to each of the intake elbows 94 located on the vacuum units 64, 65 disposed between the first end 24 and the second end 26 of the frame 18.

In yet another embodiment, the duct system 66 can comprise a variation of only the second duct network 142; that is, the duct system 66 can comprise the header duct 160 connected to the vacuum generator 62 located at the first end 24 of the frame 18, and another similar header duct can be connected to the other vacuum generator 62 located at the second end 26 of the frame 18. A first plurality of second distribution ducts 162 can be coupled to the header duct 160 connected to the vacuum generator 62 located at the first end 24 of the frame, and a second plurality of second distribution ducts 162 can be coupled to the header duct connected to the vacuum generator 62 located at the second end 26 of the frame.

As outlined above, in addition to the conveyor assembly 12 and the retaining system 14, the overhead conveyor system 10 also comprises the stacker unit 16. During operation, the stacker unit 16 can provide an operator with the ability to control the location along the length L of the conveyor belts 20 to where the work pieces $WP_f$, $WP_{nf}$ are transported (i.e., transport location). With reference back to FIG. 1, the stacker unit 16 can comprise a controller 180, a presence sensor 182 (FIG. 5), and a counter 184 (FIG. 5).

As briefly described above, through the controller 180 the stacker unit 16 can communicate with the conveyor assembly 12 and with the retaining system 14. More specifically, during operation, the controller 180 can communicate with the power source 40, with the coils 49 of the switchable magnets 48, and with the valve controllers 92 of the switchable vacuum units 65.

During operation, the controller 180 can be in communication with the power source 40 and can vary the amount of power generated by the power source 40 and the amount of power transferred to the pulley(s) 38 connected to it. By varying the amount power transferred from the power source 40 to the pulley(s) 38, the stacker unit 16 can adjust and control the rate at which the conveyor belts 20 move along the endless looped-path P.

The controller 180 can also be in communication with the switchable magnets 48 located in each of the switchable magnet groupings 59. More specifically, the controller 180 can selectively energize the coil 49 located in each of the switchable magnets 48 to neutralize and interrupt the magnetic force M generated by the switchable magnets 48 about which the coil 49 is disposed.

The controller 180 can further be in communication with the valve controllers 92 of the switchable vacuum units 65. More specifically, the controller 180 can move the valve 100 from the open position to the closed position 102, and vice versa, to either allow or restrict, respectively, the vacuum generators 60, 62 to pull vacuum V through the chambers 82 of the switchable vacuum units 65, coupled thereto.

The presence sensor 182 can be a conventional motion sensor or detector that is known in the field. The presence sensor 182 can be disposed across the width W of the outer surfaces 30 of the conveyor belts 20 and can be in communication with the controller 180. During operation, the presence sensor 182 can instruct the overhead conveyor system 10 where to, along the length L of the conveyor belts 20, transport and release the work pieces $WP_f$, $WP_{nf}$.

The counter 184 is also a type of motion sensor or detector that is known in the field. Like the presence sensor 182, the counter 184 can be also disposed across the width W of the outer surfaces 30 of the conveyor belts 20 and can be in communication with the controller 180. During operation, the counter 184 can count the number of work pieces $WP_f$, $WP_{nf}$ that have been transported to a first location along the length L of the conveyor belts 20. Once a predetermined number of work pieces $WP_f$, $WP_{nf}$ have been transported to the first location, the counter 184 can instruct the controller 180 to transport the work pieces $WP_f$, $WP_{nf}$ to an alternate or second location along the length L of the conveyor belts 20.

Operation of the overhead conveyor system 10 of the present disclosure will now be described with respect to its various operating modes. The overhead conveyor system 10 can transport ferromagnetic work pieces $WP_f$ using only the magnetic system 42; the overhead conveyor system 10 can also transport non-ferromagnetic work pieces $WP_{nf}$ using only the vacuum system 44. It should be understood, however, that the overhead conveyor system 10 of the present disclosure can also transport both ferromagnetic work pieces $WP_f$ and non-ferromagnetic work pieces $WP_{nf}$, simultaneously, using both the magnetic system 42 and the vacuum system 44. It should be further understood that the overhead conveyor system 10 of the present disclosure can also transport ferromagnetic work pieces $WP_f$ using only the vacuum system 44.

Operation of the overhead conveyor system 10 for transporting ferromagnetic work pieces $WP_f$ using only the magnetic system 42 can be described as follows. The permanent magnets 46 and the switchable magnets 48 can generate a magnetic force M that is directed downward and away from the bottom surfaces 50, 54 of the magnets 46, 48, respectively. The steel inserts that are disposed within the material thickness T of each of the conveyor belts 20 are attracted to the magnetic force M. The attraction causes the conveyor belts 20 to be pulled upwards and against the bottom surfaces 50, 54 of the magnets 46, 48, respectively. As a result, as the drive mechanism 22 moves the conveyor belts 20 along the endless looped-path P, the inner surfaces 28 of the conveyor belts 20 rub gently across the bottom surfaces 50, 54 of the magnets 46, 48.

The ferromagnetic work pieces $WP_f$ can then presented to the overhead conveyor system 10 by, for example, conveying the work pieces $WP_f$ on a precursor conveyor system (not illustrated) to a location below the outer surfaces 30 of the moving conveyor belts 20, near the first end 24 of the frame 18, for example. The magnetic force M generated by the magnets 46, 48 is sufficient to penetrate the material thickness T of the conveyor belts 20, lift the work pieces $WP_f$ up from the precursor conveyor system and vertically retain the work pieces $WP_f$ against the outer surfaces 30 of the moving conveyor belts 20. The distance, or the gap between the precursor conveyor system and the outer surfaces 30 of the conveyor belts 20 can be adjustable to, for example, accommodate for the transport of work pieces $WP_f$, of various thickness. As the conveyor belts 20 continue to move along the endless looped-path P, the magnetic force M generated by the magnets 46, 48 disposed along the entire length L of the conveyor belts 20 continues to retain the work pieces $WP_f$ against the outer surfaces 30 of the conveyor belts 20.

In an alternate embodiment, the work pieces $WP_f$ can be conveyed to a location near the first end 24 of the frame 18 on the precursor conveyor system and subsequently pushed up or blown up to the outer surfaces 30 of the moving conveyor belts 20, with, for example, one or more air knives. In yet another alternate embodiment, the precursor conveyor system can comprise a roller table with an inclination directed towards the outer surfaces 30 of the conveyor belts 20 to reduce the distance or the gap between the precursor conveyor system and the outer surfaces 30 of the conveyor belts 20.

Once the vertically retained work pieces $WP_f$ approach a predetermined location along the length L of the moving conveyor belts 20 to where the work pieces $WP_f$ are desired to be transported (i.e., the transport location), or once a predetermined number of work pieces $WP_f$ have been transported to a first location, the presence sensor 182 and/or the counter 184, respectively, can instruct the stacker unit 16 to initiate operation of the switchable magnet grouping 59 that is located above the transport location. More specifically, the coils 49 located in the switchable magnet grouping 59 arranged across the width W of the conveyor belts 20 in the transport location are energized (i.e., switched on) by the controller 180. Accordingly, the magnetic force M in the transport location is neutralized, and the magnetic force M can no longer retain the work pieces $WP_f$ against the outer surface 30 of the conveyor belts 20 at the transport location. As a result, the work pieces $WP_f$ can be controllably released at the transport location. It should be understood, however, because the controller 180 only energizes the coils 49 of the switchable magnet grouping 59 in the transport location, other work pieces $WP_f$ that may be vertically retained against the outer surfaces 30 of the conveyor belts 20 at other locations along the length L are not affected and can remain vertically retained against the outer surfaces 30 of the moving conveyer belts 20.

At the same time the coils 49 in the switchable magnet grouping 59 in the transport location are energized, the controller 180 can also instruct the power source 40 to concurrently reduce the rotating speed of the pulley(s) 38 and to, therefore, slow the movement of the conveyor belts 20. By slowing the movement of the conveyor belts 20, the work pieces $WP_f$ can be released at the transport location in a more precise and controlled manner.

Once the work pieces $WP_f$ have been released from the moving conveyor belts 20 at the transport location, the controller 180 can then discontinue energizing the coils 49 in the transport location, and resume the magnetic force M in the transport location. Further, the controller 180 can also instruct the power source 40 to resume the previous rotational speed of the pulley(s) 38 such that the conveyor belts 20 resume movement along the endless looped-path P at the previous rate.

Operation of the overhead conveyor system 10 with respect to transporting, e.g., non-ferromagnetic work pieces $WP_{nf}$ using only the vacuum system 44 will now be described. The controller 180 can move the valves 100 of the switchable vacuum units 65 into the open position. As described above, the valves 100 in the permanent vacuum units 64 remain in the open position during operation. With all of the valves 100 in the open position, the first vacuum generator 60 can pull vacuum V through the chambers 82 of the vacuum unit groupings 134, 135 arranged near the first end 24 of the frame 18. Similarly, the two second vacuum generators 62 can pull vacuum V through the chambers 82 of the vacuum unit groupings 134, 135 arranged a distance away from the first end 24 of the frame 18 to the second end 26 of the frame 18. The apertures 84 that are disposed through the bottom surfaces 76 of the vacuum units 64, 65 provide for the vacuum V pulled by the vacuum generators 60, 62 to also pull the conveyor belts 20 upwards and against the bottom surfaces 76 of the vacuum units 64, 65. As a result, as the drive mechanism 22 moves the conveyor belts 20 along the endless looped-path P, the inner surfaces 28 of the conveyor belts 20 rub gently across the bottom surfaces 76 of the vacuum units 64, 65.

Alternatively, if the duct system 66 only comprises the first duct network 140 (i.e., the first distribution duct 144 coupled to the first vacuum generator 60, and the first vacuum lines 146 coupled to the first distribution duct 144 and to each of the vacuum units 64, 65), the first vacuum generator 60 can pull vacuum V through all of the chambers 82 of the vacuum unit groupings 134, 135 arranged between the first and second ends 24, 26 of the frame 18. If the duct system 66 only comprises the second duct network 142 (i.e., the header duct 160 disposed between the two vacuum generators 62 located at opposite ends 24, 26 of the frame 18, the second distribution ducts 162 coupled to the header duct 160, and the second vacuum lines 164 coupled to the second distribution ducts 162), the two vacuum generators 62 together can pull vacuum V through all of the chambers 82 of the vacuum unit groupings 134, 135 arranged between the first and second ends 24, 26 of the frame 18. If the duct system 66 comprises a variation of the second duct network 142 (i.e., the header duct 160 connected to the vacuum generator 62 located at the first end 24 of the frame 18, and another similar header duct connected to the other vacuum generator 62 located at the second end 26 of the frame 18), the vacuum generator 62 located at the first end 24 of the frame 18 can pull vacuum V through the chambers 82 of the vacuum unit groupings 134, 135 arranged near the first end 24 of the frame 18 and the vacuum generator 62 located at the second end 26 of the frame 18 can pull vacuum V through the chambers 82 of the vacuum unit groupings 134, 135 arranged a distance away from the first end 24 of the frame 18 to the second end 26.

Regardless of the exact duct system 66 configuration, the non-ferromagnetic work pieces $WP_{nf}$ can be presented to the overhead conveyor system 10 by, for example, conveying the work pieces $WP_{nf}$ on a precursor conveyor system (not illustrated) to a location below the outer surfaces 30 of the moving conveyor belts 20, near the first end 24 of the frame 18. The vacuum V generated by the first vacuum generator 60 (or one of the second vacuum generators 62 in the other configurations) is drawn through the orifices 32 disposed throughout the material thickness T of the conveyor belts 20, and is to lift the work pieces $WP_{nf}$ up from the precursor conveyor system and vertically retain the work pieces $WP_{nf}$ against the outer surfaces 30 of the moving conveyor belts 20. The distance, or the gap between the precursor conveyor system and the outer surfaces 30 of the conveyor belts 20 can be adjustable to, for example, accommodate for the transport of work pieces $WP_{nf}$ of various thickness. As the conveyor belts 20 continue to move along the endless looped-path P, the vacuum V generated by one or both of the second vacuum generators 62 (or the first vacuum generator 60 in the other configurations) and drawn through the vacuum units 64, 65 disposed along the entire length L of the conveyor belts 20 continues to vertically retain the work pieces $WP_{nf}$ against the outer surfaces 30 of the moving conveyor belts 20.

In an alternate embodiment, the work pieces $WP_{nf}$ can be conveyed to a location near the first end 24 of the frame 18 on the precursor conveyor system and then subsequently pushed up or blown up to the outer surfaces 30 of the moving conveyor belts 20, with, for example, one or more air knives. And in another embodiment yet, the precursor conveyor system can comprise a roller table with an inclination directed towards the outer surfaces 30 of the conveyor belts 20 to reduce the distance or the gap between the precursor conveyor system and the outer surfaces 30 of the conveyor belts 20.

Once the vertically retained work pieces $WP_{nf}$ approach the transport location along the length L of the moving conveyor belts 20 to where the work pieces $WP_{nf}$ are desired to be transported or once a predetermined number of work pieces $WP_{nf}$ have been transported to a first location, the presence sensor 182 and/or counter 184, respectively, can instruct the stacker unit 16 to initiate operation of the switchable vacuum unit grouping 135 located above the transport location. More specifically, the controller 180 can move the valves 100 in the switchable vacuum unit grouping 135 arranged across the width W of the conveyor belts 20 above the transport location from the open position into the closed position 102. As a result, one or more of the vacuum generator(s) 60, 62 are unable to pull vacuum V through the valve body 90 or through the respective chambers 82 at the transport location. Accordingly, the work pieces $WP_{nf}$ are no longer able to be vertically retained against the outer surfaces 30 of the conveyor belts 20 at the transport location and are controllably released from the conveyor belts 20 at the transport location.

It should be understood, however, because the controller 180 only moves the valves 100 of the switchable vacuum unit grouping 135 located above the transport location into the closed position 102, other work pieces $WP_{nf}$ that may be vertically retained against the outer surfaces 30 of the conveyor belts 20 at other locations along the length L of the conveyor belts 20 are not affected and remain vertically retained on the conveyor belts 20 at those locations.

At the same time the valves 100 of the switchable vacuum units 65 are moved into the closed position 102, the controller 180 can also instruct the power source 40 to concurrently reduce the rotating speed of the pulley(s) 38 to slow the movement of the conveyor belts 20. By slowing the movement of the conveyor belts 20, the work pieces $WP_{nf}$ can be released at the transport location in a more precise and controlled manner.

Once the work pieces $WP_{nf}$ have been released from the conveyor belts 20 at the transport location, the controller 180 can then instruct the valve controllers 92 in the transport location to move the valves 100 back into the open position. One or more of the vacuum generators 60, 62 (depending on the configuration) can then resume pulling vacuum V through the chambers 82 at the transport location. The volume of vacuum V that is temporarily stored in the elbow bend 95 of the valve assemblies 70 in the transport location allows for the vacuum generator(s) 60, 62 to quickly recover pulling vacuum through the those chambers 82. Further, the controller 180 can also instruct the power source 40 to resume the previous rotational speed of the pulleys 38 such that the conveyor belts 20 move along the endless looped-path P at the previous rate.

It should be understood that the foregoing operation of the overhead conveyor system 10 using only the vacuum system 44 can also be employed to transport ferromagnetic work pieces $WP_f$.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for transporting work pieces, the system comprising:
  a frame, the frame including a first end and a second end;
  a moving conveyor belt supported on the frame and extending between the first end and the second end of the frame, the conveyor belt comprising a plurality of orifices therethrough;
  a magnetic system supported on the frame operable to generate a magnetic force sufficient to vertically retain a work piece against the moving conveyor belt;
  a vacuum system supported on the frame, the vacuum system including a vacuum generator and a plurality of vacuum units, the vacuum system operable to generate a vacuum at at least a portion of the plurality of orifices through the conveyor belt sufficient to vertically retain the work piece against the moving conveyor belt; and
  a stacker unit supported on the frame, the stacker unit configured to selectively neutralize the first magnetic force generated by the first magnet to release the work pieces from the moving conveyor belt at a transport location, the stacker unit operable to selectively interrupt the first vacuum pulled by the first vacuum unit to release the work pieces from the moving conveyor belt at the transport location;

wherein the vacuum generator comprises a first vacuum generator supported on the frame;

wherein the plurality of vacuum units comprise a first vacuum unit supported on the frame and a second vacuum unit supported on the frame; and wherein the first vacuum unit and the second vacuum unit are in communication with the first vacuum generator via a first header duct, the first vacuum generator operable to draw a first vacuum through the first vacuum unit and a second vacuum through the second vacuum unit to lift and vertically retain at least one of the work pieces against the moving conveyor belt.

2. The system of claim 1 wherein the work piece comprises one of a ferromagnetic work piece and a non-ferromagnetic work piece, the magnetic force operable to vertically retain the ferromagnetic work piece against the moving conveyor belt and the vacuum operable to vertically retain the ferromagnetic work piece and non-ferromagnetic work piece against the moving conveyor belt; and wherein the magnetic system comprises:
 a first magnet operable to generate a first magnetic force and including a coil configured to be selectively energized by the stacker unit to neutralize the first magnetic force, the ferromagnetic work piece being released from against the moving conveyor belt at a transport location when the first magnetic force is neutralized; and
 a second magnet operable to generate a second magnetic force, the first magnetic force and the second magnetic force operable to vertically retain the ferromagnetic work piece on the moving conveyor belt, the second magnetic force not being neutralized when the first magnetic force is neutralized.

3. The system of claim 2, wherein one or both of the first magnet and the second magnet is a neodymium magnet.

4. The system of claim 2 wherein the magnetic system comprises a plurality of the first magnets and a plurality of the second magnets, the plurality of the first magnets and the plurality of the second magnets being alternatingly attached to the frame in a row of magnets such that one first magnet is located adjacent one second magnet, the row of magnets extends between the first end and the second end of the frame.

5. The system of claim 4 comprising six rows of magnets.

6. The system of claim 2, wherein the magnetic system comprises a plurality of the first magnets and a plurality of the second magnets wherein at least two first magnets are sequentially arranged and attached to the frame and at least two of the second magnets are sequentially arranged and attached to the frame, the at least two sequentially arranged first magnets and the at least two sequentially arranged second magnets are arranged in a row of magnets extending between the first end and the second end of the frame.

7. The system of claim 1 comprising a plurality of the first vacuum units and a plurality of the second vacuum units, the plurality of the first vacuum units and the plurality of the second vacuum units being alternatingly attached to the frame in at least one row of vacuum units such that one first vacuum unit is located adjacent one second vacuum unit, the at least one row of vacuum units extending between the first end of the frame and the second end of the frame.

8. The system of claim 7 comprising four rows of vacuum units.

9. The system of claim 1, wherein the first vacuum unit and the second vacuum unit each comprise:
 a base, the base comprising a bottom surface and an oppositely located top surface;
 a divider wall disposed between the bottom surface and the top surface of the base, the divider wall creating a first chamber section and a second chamber section within the base;
 at least one aperture disposed through the bottom surface of the base;
 a first port and a second port disposed on the top surface of the base;
 a valve module disposed atop each port, each valve module comprising a body and a valve disposed within the body, each valve module further comprising a valve controller in communication with the valve, the valve controller configured to move the valve between an open position and a closed position such that when the valve is in the open position the first vacuum and the second vacuum pulled by the first vacuum generator is operable to lift and vertically retain one or both of the ferromagnetic work pieces and the non-ferromagnetic work pieces on the moving conveyor belt, when the valve is in the closed position the first vacuum generator is unable to pull the first vacuum and the second vacuum and one or both of the ferromagnetic work pieces and non-ferromagnetic work pieces are released from the moving conveyor belt at the transport location, the stacker unit is in communication with the valve module of one of the first vacuum unit and the second vacuum unit to move the valve between the closed position and the open position while the valve of the other of the first vacuum unit and the second vacuum unit remains in the open position; and
 an intake elbow, the intake elbow comprising an area where the vacuum can be temporarily stored once the valve is moved from the open position into the closed position.

10. The system of claim 9 further comprising a first plurality of vacuum lines, each of the first plurality of vacuum lines being coupled to the first header duct, each of the first plurality of vacuum lines being further coupled to the intake elbow of a first series of the first vacuum units and the second vacuum units located near the first end of the frame, the first vacuum generator pulling the first vacuum and the second vacuum through the first series of the first vacuum units and the second vacuum units, respectively via the first header duct and the first plurality of vacuum lines.

11. The system of claim 10 wherein the vacuum system further comprises:
 a second vacuum generator supported on the frame, the first header duct in communication with both the first vacuum generator and the second vacuum generator; and
 a second plurality of vacuum lines, each of the second plurality of vacuum lines being coupled to one of the first plurality of vacuum lines, each of the second plurality of vacuum lines further coupled to either the intake elbow of the first series of the first vacuum units and the second vacuum units or to the intake elbow of a second series of first vacuum units and second vacuum units located near the second end of the frame, the first vacuum generator and the second vacuum generator pulling the first vacuum and the second vacuum through the first series of the first vacuum units and the second vacuum units, respectively, and the second series of the first vacuum units and the second vacuum unit, respectively.

12. The system of claim 11 wherein the vacuum system further comprises:
- a third vacuum generator supported on the frame;
- a distribution duct supported on the frame and coupled to the third vacuum generator; and
- a third plurality of vacuum lines, each of the third plurality of vacuum lines coupled to the distribution duct, each of the third plurality of vacuum lines further coupled to the intake elbow on an input series of the first vacuum units and the second vacuum units located at the first end of the frame, the third vacuum generator pulling the first vacuum and the second vacuum through the input series of the first vacuum units and the second vacuum units, respectively.

13. The system of claim 9, wherein the stacker unit comprises:
- a presence sensor disposed across a width of the moving conveyor belt; and
- a counter disposed across the width of the moving conveyor belt, wherein the presence sensor and the counter each locate at least one of the ferromagnetic work pieces and the non-ferromagnetic work pieces retained against the moving overhead conveyor belt and instructs at least one of the coil of the first magnet to selectively energize and neutralize the first magnetic force of the first magnetic to release the ferromagnetic work pieces from the moving conveyor belt at the transport location and the valve controller in one of the first vacuum unit and the second vacuum unit to move the valve to the closed position to release one or both of the ferromagnetic work pieces and the non-ferromagnetic work pieces from the moving conveyor belt at the transport location.

14. The system of claim 13 comprising two moving conveyor belts supported on the frame and extending between the first end and the second end of the frame.

15. The system of claim 14 wherein each of the two moving conveyor belts comprise an inner surface and an outer surface, the ferromagnetic and the non-ferromagnetic work pieces being retained on the outer surfaces of each of the two moving conveyor belts.

16. The system of claim 1 further comprising a hanger, the hanger configured to couple at least one of the first magnet, the second magnet, the first vacuum unit, and the second vacuum unit to the frame, the hanger comprising:
- a flange comprising a vertical portion and a horizontal portion, a proximal end of the vertical portion is coupled to at least one of the first magnet, the second magnet, the first vacuum unit, and the second vacuum unit, the horizontal portion is coupled to a distal end of the vertical portion, the horizontal portion includes an aperture;
- a threaded rod, the threaded rod is disposed through the aperture in the horizontal portion, the threaded rod comprises a hex cap at a distal end thereof;
- a fastening means including at least one lock nut, at least one first jam nut, and at least one second jam nut, the at least one lock nut, the at least one first jam nut, and the at least one second jam nut are threaded onto the threaded rod near a proximate end of the threaded rod, the at least one first lock nut and the at least one first jam nut securing the threaded rod to the horizontal portion;
- a lower bracket, the lower bracket shared between two adjacent at least one of the first magnet, the second magnet, the first vacuum unit, and the second vacuum unit, the lower bracket comprising at least two apertures, the threaded rod from each at least one hanger being disposed through each aperture of the lower bracket, the at least one second jam nut supporting the lower bracket on the threaded rod; and
- an upper bracket, the upper bracket including an aperture for receiving the threaded rod, a portion of the frame is disposed between the lower bracket and the upper bracket, the lock nut, the at least one first jam nut and the at least one second jam nut further providing an adjustment means for adjusting a position of the at least one of the first magnet, the second magnet, the first vacuum unit, and the second vacuum unit.

17. The system of claim 1 further comprising a driving mechanism, the driving mechanism comprising:
- one pair of oppositely positioned pulleys supported on the frame;
- a power source coupled to the at least one of the pulleys, the power source causing the at least one pulley to rotate, wherein the moving conveyer belt is disposed about the rotating pulleys.

18. A system for transporting ferromagnetic work pieces and non-ferromagnetic work pieces, the system comprising:
- a frame, the frame comprising a first end and a second end;
- a pair of moving conveyor belts supported on the frame and extending between the first end and the second end of the frame, each of the moving conveyor belts having an inner surface and an outer surface and comprising a plurality of orifices therethrough;
- a magnetic system supported on the frame operable to generate a magnetic force to vertically retain ferromagnetic work pieces against the outer surface of the moving conveyor belt;
- a vacuum system supported on the frame, the vacuum system including a vacuum generator and a plurality of vacuum units, the vacuum system operable to generate a vacuum at at least a portion of the plurality of orifices through the conveyor belt to vertically retain the ferromagnetic work pieces and non-ferromagnetic work pieces against the outer surface of the moving conveyor belt; and
- a stacker unit supported on the frame, the stacker unit operable to selectively neutralize the first magnetic force generated by the first magnet to release the ferromagnetic work pieces from the moving conveyor belt at a transport location, the stacker unit operable to selectively interrupt the vacuum pulled by the first vacuum unit to release either or both of the ferromagnetic and non-ferromagnetic work pieces from the moving conveyor belt at the transport location;

wherein at least one vacuum unit comprises:
- a base, the base comprising a bottom surface and a top surface that is located opposite the bottom surface;
- a divider wall disposed between the bottom surface and the top surface of the base, the divider wall creating a first chamber section and a second chamber section within the base;
- at least one aperture disposed through the bottom surface of the base;
- a first port and a second port disposed on the top surface of the base;
- a valve module disposed atop each port, the valve module comprising a body and a valve disposed within the body, the valve module further comprising a valve controller in communication with the valve, the valve controller configured to move the valve between an open position and a closed position such that when the valve is in the open position the vacuum is operable to lift and vertically retain either or both of the ferromagnetic work pieces and non-ferromagnetic work pieces on the at least one moving conveyor belt, when the valve is in the closed position either or both of the ferromagnetic work pieces and non-ferromagnetic work pieces are released from the at least one moving conveyor belt at the transport location; and an intake elbow, the intake elbow comprising an area where the vacuum can be temporarily stored once the valve of the first vacuum unit is moved from the open position into the closed position, wherein the stacker unit is in communication with the valve controller of the first vacuum unit to move the valve between the closed position and the open position.

19. The system of claim 18, wherein the vacuum system further comprises:

a first vacuum generator and a first vacuum unit supported on the frame, the first vacuum unit in communication with the first vacuum generator, the first vacuum generator generating the vacuum through the first vacuum unit; and wherein the first vacuum generator is operable to draw the vacuum through a first series of first vacuum units located near the first end of the frame.

20. The system of claim 19 wherein the vacuum system further comprises:

a second vacuum generator supported on the frame, wherein the second vacuum generator is operable to draw the vacuum through a second series of the first vacuum units located near a center of the frame and the second end of the frame.

21. The system of claim 20 wherein the vacuum system further comprises:

a third vacuum generator supported on the frame and in communication with the second vacuum generator, the second vacuum generator and the third vacuum generator being operable to draw the vacuum through the second series of the first vacuum units.

22. The system of claim 18, wherein the magnetic system comprises a first magnet operable to generate a first magnetic force, the first magnet comprising a coil configured to be selectively energized by the stacker unit, the first magnetic force being neutralized when the coil is selectively energized by the stacker unit; and a second magnet generating a second magnetic force for lifting and vertically retaining ferromagnetic work pieces on the outer surface of the moving conveyor belt, wherein the second magnetic force is not affected by the coil when the coil is selectively energized by the stacker unit.

23. A method for converting an overhead conveying system that uses magnetic force to transport work pieces from one location to another into an overhead conveying system that uses either or both magnetic force and vacuum to transport work pieces from one location to another, the method comprising:

attaching a first vacuum generator and a second vacuum generator to the overhead conveying system;

coupling a row of vacuum units to the overhead conveying system adjacent a row of magnetic units;

adjusting a vertical height of the at least one row of vacuum units such that a bottom plane of the vacuum units is generally co-planar with a bottom plane of the magnetic units;

; and coupling a first end of a first distribution duct to the first vacuum generator;

coupling a first end of at least one first vacuum line to the first distribution duct;

coupling a second end of the at least one first vacuum line to a valve located on each vacuum unit located near a first end of the overhead conveyor system;

coupling a second end of the first distribution duct to the second vacuum generator;

coupling a first end of the at least one second vacuum line to the first distribution duct;

coupling the first end of the at least one first vacuum line to the second vacuum line;

coupling a second end of the at least one first vacuum line to a valve located on each vacuum unit located near a second end of the overhead conveyor system; and creating at least one aperture through a moving conveyor belts.

24. The method of claim 23, further comprising:

attaching a third vacuum generator to the overhead conveyor system;

coupling a first end of a first header duct to the third vacuum generator;

coupling a first end of a third vacuum line to the first header duct; and coupling a second end of the third vacuum line to a valve located on each vacuum unit disposed at an input end of the overhead conveyor system.

* * * * *

UNITED STATES PATENT AND TRADEMARK OFFICE
CERTIFICATE OF CORRECTION

| | | |
|---|---|---|
| PATENT NO. | : 9,604,796 B2 | Page 1 of 1 |
| APPLICATION NO. | : 15/027532 | |
| DATED | : March 28, 2017 | |
| INVENTOR(S) | : James H. Witte et al. | |

It is certified that error appears in the above-identified patent and that said Letters Patent is hereby corrected as shown below:

In the Claims

In Column 24, Line 37, Claim 23, delete "belts", and insert therefor --belt--.

Signed and Sealed this
Thirtieth Day of May, 2017

Michelle K. Lee
*Director of the United States Patent and Trademark Office*